US008035529B2

(12) United States Patent
Veskovic et al.

(10) Patent No.: US 8,035,529 B2
(45) Date of Patent: Oct. 11, 2011

(54) DISTRIBUTED INTELLIGENCE BALLAST SYSTEM

(75) Inventors: Dragan Veskovic, Allentown, PA (US); Robert Anselmo, Allentown, PA (US); Audwin W. Cash, Bethlehem, PA (US); Matthew A. Skvoretz, Columbia, SC (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 804 days.

(21) Appl. No.: 12/055,976

(22) Filed: Mar. 26, 2008

(65) Prior Publication Data

US 2008/0180270 A1 Jul. 31, 2008

Related U.S. Application Data

(62) Division of application No. 11/011,933, filed on Dec. 14, 2004, now Pat. No. 7,369,060.

(51) Int. Cl.
*H04L 7/00* (2006.01)

(52) U.S. Cl. ............ 340/825.21; 340/825.22; 340/825.5

(58) Field of Classification Search ............. 340/825.21, 340/825.22, 825.5
See application file for complete search history.

(56) References Cited

U.S. PATENT DOCUMENTS

| | | | | |
|---|---|---|---|---|
| 4,467,314 | A | 8/1984 | Weikel et al. | 340/310 |
| 4,538,218 | A | 8/1985 | Watson | 362/802 |
| 4,874,989 | A | 10/1989 | Nilssen | 315/151 |
| 5,191,265 | A | 3/1993 | D'Aleo et al. | 315/295 |
| 5,216,333 | A | 6/1993 | Nuckolls et al. | 315/291 |
| 5,237,168 | A | 8/1993 | Giust et al. | 250/214 |
| 5,237,169 | A | 8/1993 | Grehant | 250/214 |
| 5,352,957 | A | 10/1994 | Werner | 315/291 |
| 5,453,738 | A | 9/1995 | Zirkl et al. | 340/825 |
| 5,454,077 | A | 9/1995 | Cheron | |
| 5,455,487 | A | 10/1995 | Mix et al. | 315/150 |
| 5,463,286 | A | 10/1995 | D'Aleo et al. | 315/295 |
| 5,471,119 | A | 11/1995 | Ranganath et al. | 315/307 |
| 5,532,560 | A | 7/1996 | Element et al. | |
| 5,544,037 | A | 8/1996 | Luger | 364/146 |
| 5,554,979 | A | 9/1996 | Kohar et al. | 340/825.72 |
| 5,565,855 | A | 10/1996 | Knibbe | 340/825.06 |

(Continued)

FOREIGN PATENT DOCUMENTS

DE 195 30 643 5/1996

(Continued)

OTHER PUBLICATIONS

Tridoni.Atco, "Electronic Ballasts for Dimming to 3% (10%) Compact Lamps", Data Sheet, Jun. 2002, 4 pages.

(Continued)

*Primary Examiner* — Tuyet Thi Vo
(74) *Attorney, Agent, or Firm* — Ostrolenk Faber LLP

(57) ABSTRACT

A ballast for use in a multi-ballast lighting system wherein the ballasts are coupled together by a digital communication network. The ballast comprises a power circuit portion for providing an electrical current to power a lamp. The ballast further includes a sensor input circuit for receiving at least one sensor input from a sensor device, a processor receiving an input from the sensor input circuit and providing control signals to control the operation of the ballast, and a communication port coupled to the processor and to the communication network for exchanging data. The ballast processor is operative to receive a serial data that has a portion defining whether the message is in a first or a second format, the first format comprising a DALI standard format and the second format comprising a format providing extended functionality. The ballast processor is capable of processing messages in either the first or second formats.

11 Claims, 11 Drawing Sheets

U.S. PATENT DOCUMENTS

| | | | | |
|---|---|---|---|---|
| 5,572,438 | A | 11/1996 | Ehlers et al. | |
| 5,661,347 | A | 8/1997 | Luger et al. | 307/39 |
| 5,675,221 | A | 10/1997 | Yoo et al. | 315/291 |
| 5,701,058 | A | 12/1997 | Roth | 315/158 |
| 5,742,131 | A | 4/1998 | Sprout et al. | |
| 5,838,116 | A | 11/1998 | Katyl et al. | |
| 5,866,992 | A | 2/1999 | Geiginger et al. | 35/294 |
| 5,925,990 | A | 7/1999 | Crouse et al. | 315/307 |
| 5,969,492 | A | 10/1999 | Motte et al. | |
| 6,025,679 | A | 2/2000 | Harper et al. | 315/312 |
| 6,037,721 | A | 3/2000 | Lansing et al. | 315/295 |
| 6,064,949 | A | 5/2000 | Werner et al. | 702/134 |
| 6,084,231 | A | 7/2000 | Popat | 250/214 |
| 6,094,016 | A | 7/2000 | Luger et al. | 315/295 |
| 6,114,970 | A | 9/2000 | Kirson et al. | 340/825.52 |
| 6,118,231 | A | 9/2000 | Geiginger et al. | 315/312 |
| 6,181,086 | B1 | 1/2001 | Katyl et al. | 315/307 |
| 6,225,760 | B1 | 5/2001 | Moan | 315/360 |
| 6,298,273 | B1 | 10/2001 | Grehant et al. | |
| 6,307,331 | B1 | 10/2001 | Bonasia et al. | 315/294 |
| 6,310,440 | B1 | 10/2001 | Lansing et al. | 315/149 |
| 6,388,396 | B1 | 5/2002 | Katyl et al. | 315/294 |
| 6,388,399 | B1 | 5/2002 | Eckel et al. | |
| 6,388,400 | B1 | 5/2002 | Noh | 315/318 |
| 6,392,368 | B1 | 5/2002 | Deller et al. | |
| 6,487,457 | B1 | 11/2002 | Hull et al. | |
| 6,507,158 | B1 | 1/2003 | Wang | 315/294 |
| 6,519,509 | B1 | 2/2003 | Nierlich et al. | |
| 6,555,966 | B2 | 4/2003 | Pitigoi-Aron | |
| 6,583,573 | B2 | 6/2003 | Bierman | 315/149 |
| 6,608,453 | B2 | 8/2003 | Morgan et al. | |
| 6,667,578 | B2 | 12/2003 | Lansing et al. | 315/119 |
| 6,762,570 | B1 | 7/2004 | Fosler | 315/312 |
| 6,771,029 | B2 | 8/2004 | Ribarich et al. | 315/292 |
| 6,831,569 | B2 | 12/2004 | Wang et al. | |
| 7,155,296 | B2 | 12/2006 | Klasson et al. | |
| 7,190,126 | B1 | 3/2007 | Paton | |
| 7,193,201 | B2 | 3/2007 | Motte | |
| 7,219,141 | B2 | 5/2007 | Bonasia et al. | |
| 7,277,930 | B2 | 10/2007 | Hillis et al. | |
| 7,307,542 | B1 | 12/2007 | Chandler et al. | |
| 7,309,965 | B2 | 12/2007 | Dowling et al. | |
| 7,394,451 | B1 | 7/2008 | Patten et al. | |
| 2002/0065583 | A1 | 5/2002 | Okada et al. | 700/295 |
| 2002/0099451 | A1 | 7/2002 | Wang | 700/4 |
| 2002/0154025 | A1 | 10/2002 | Ling | 340/825.69 |
| 2003/0020595 | A1 | 1/2003 | Wacyk | 340/3.5 |
| 2003/0036807 | A1 | 2/2003 | Fosler | 700/3 |
| 2003/0048626 | A1 | 3/2003 | Johler et al. | 362/20 |
| 2003/0057886 | A1 | 3/2003 | Lys et al. | |
| 2003/0222603 | A1 | 12/2003 | Mogilner et al. | 315/294 |
| 2004/0002792 | A1 | 1/2004 | Hoffknecht | 700/295 |
| 2004/0051485 | A1 | 3/2004 | Chansky et al. | |
| 2004/0160197 | A1 | 8/2004 | Wilhelm | 315/291 |
| 2004/0160199 | A1 | 8/2004 | Morgan et al. | |
| 2004/0232856 | A1 | 11/2004 | Huber | 315/291 |
| 2004/0245943 | A1 | 12/2004 | Huber | 315/291 |
| 2005/0179404 | A1 | 8/2005 | Veskovic et al. | |
| 2007/0061050 | A1 | 3/2007 | Hoffknecht | |

FOREIGN PATENT DOCUMENTS

| | | | |
|---|---|---|---|
| EP | 0 444 635 | A | 9/1991 |
| EP | 0 688 153 | | 12/1995 |
| EP | 0 689 373 | | 12/1995 |
| EP | 0 706 307 | | 4/1996 |
| EP | 0 989 787 | | 3/2000 |
| EP | 1 292 175 | | 3/2003 |
| GB | 2 390 203 | | 12/2003 |
| GB | 2 397 202 | | 7/2004 |
| JP | 2003-317975 | | 11/2003 |
| JP | 2004-185877 | | 7/2004 |
| JP | 2004-535054 | | 11/2004 |
| WO | WO 99/23858 | | 5/1999 |
| WO | WO 99/60804 | A | 11/1999 |
| WO | WO 02/082283 | | 10/2002 |
| WO | WO 03/007665 | | 1/2003 |
| WO | WO 03/007665 | A1 | 1/2003 |
| WO | WO 03/094579 | A | 11/2003 |
| WO | WO 2005/004552 | | 1/2005 |
| WO | WO 2005/025277 | | 3/2005 |

OTHER PUBLICATIONS

Trostl, A., "Let There Be Light!, A Self Configuring Dimming Interface for Fluorescent Lamp Ballasts", IEEE Industry Applications Magazine, Nov./Dec. 2004, pp. 12-18.

National Electrical Manufacturers Association, "Digital Addressable Lighting Interface (DALI) Control Devices Protocol, Part 2-2004", NEMA Standards Publication 243-2004, Oct. 2004, 122 pages.

National Electrical Manufacturers Association, "Digital Addressable Lighting Interface (DALI) Control Devices Protocol, Part 2-2004", NEMA Standards Publication 243-2004, Oct. 2004, 32 pages.

Philips Lighting BV, "MultiDim Control System", Data Sheet, Jun. 2004, 14 pages.

Philips Lighting BV, "MultiDim Installation and Design Manual", Data Sheet, Jun. 2004, 74 pages.

Japanese Office Action dated Apr. 13, 2010 issued in corresponding Japanese Patent Application 2007-546774.

Canadian Office Action dated Mar. 1, 2011 issued in corresponding Canadian Patent Application 2,590,710.

DISTRIBUTED INTELLIGENCE BALLAST SYSTEM

CROSS-REFERENCE TO RELATED APPLICATION

This application is a divisional of U.S. patent application Ser. No. 11/011,933, filed Dec. 14, 2004, entitled DISTRIBUTED INTELLIGENCE BALLAST SYSTEM AND EXTENDED LIGHTING CONTROL PROTOCOL, the entire contents of which is hereby incorporated by reference.

BACKGROUND OF THE INVENTION

1. Field of the Invention

The present invention relates generally to a multi-ballast lighting and control system, and, more particularly, to a distributed intelligence multi-ballast lighting system employing a DALI backward compatible extended protocol for messages in a lighting control network that extends the functionality of the lighting control network.

2. Description of Related Art

In recent years, large-scale lighting systems have been developed to meet the needs of lighting applications with distributed resources and centralized control. For example, building lighting systems are often controlled on a floor by floor basis or as a function of the occupancy space used by independent groups in the building. Taking a floor of a building as an example, each room on the floor may have different lighting requirements depending on a number of factors including occupancy, time of day, tasks ongoing in a given room, security and so forth, for example.

When a number of rooms are linked together for lighting purposes, control of lighting in those rooms can be centralized over a network. For example, while power to various lighting modules can be supplied locally, control functions and features of the lighting system can be directed through a control network that sends and receives messages between a controller and various lighting system components. For instance, a room with an occupancy sensor may deliver occupancy-related messages over the network to inform the controller of the occupancy condition of the given room. If the room becomes occupied, the lighting controller can cause the lighting in that room to turn on, or be set to a specified dimming level.

When messages are exchanged in the lighting control network, a protocol is employed to permit the various network components to communicate with each other. One popular protocol presently in use is the Digital Addressable Lighting Interface (DALI) protocol. The DALI protocol represents a convention for communication adopted by lighting manufacturers and designers to permit simple messages to be communicated over a lighting network in a reasonably efficient manner. The DALI protocol calls for a 19 bit message to be transmitted among various network components to obtain a networked lighting control. The 19 bit message is composed of address bits and command bits, as well as control bits for indicating the operations to be performed with the various bit locations and the message. For example, one type of message provides a 6 bit address and an 8 bit command to deliver a command to the addressed network component. By using this protocol technique, sixty-four different devices may be addressed on the lighting network to provide the network control. A large number of commands can be directed to the addressable devices, including such commands as setting a power on level, fade time and rates, group membership and so forth.

A conventional ballast control system, such as a system conforming to the DALI protocol, includes a hardware controller for controlling ballasts in the system. Typically, the controller is coupled to the ballasts in the system via a single digital serial interface, wherein data is transferred. A disadvantage of this single interface is that the bandwidth of the interface limits the amount of message traffic that can reasonably flow between the controller and the ballasts. This can also create delays in times to commands.

In the present day DALI protocol, a portion of the command space is set aside for future functionality, or for adaptation by individual users. However, the reserved command space provides limited additional functionality due to the relatively small number of commands available in the space that is set aside. In addition, it is less desirable to use the reserved command space for customized network lighting applications, due to problems with interoperability. For example, if different manufacturer components are used on a DALI lighting network, and the components expect to use a command in the reserved command space for different purposes, the lighting network would operate improperly due to the conflict in the command space.

More recently, lighting designers have demanded greater functionality from lighting networks to realize improved features in the operation of a lighting system. For example, the lighting designer may desire that a number of lighting components may be located in a single room, each of which may require an address. One simple example is a room that includes multiple ballasts for control of fluorescent lamps, a photosensor to determine the amount of light in the room, an occupancy sensor, and a control station. It is desirable to have these components provided over one single lighting control network.

As more and more demands are placed on the lighting control network to increase the functionality of the lighting system, the DALI protocol becomes limited in its ability to handle a wide variety of commands, even when the reserved command space is utilized. In addition, the addressing arrangement in the DALI protocol is limited to 64 addresses for each DALI controller. As more lighting devices are connected to a DALI network, additional DALI controllers are needed because of the limited address space. With a large number of DALI controllable devices in a building, a number of DALI controllers are used and a building control system or network is connected to the DALI controllers to provide further extendibility and flexibility in the lighting control for the building. Such an arrangement can become increasingly expensive and fault intolerant as more and more devices are added to each DALI network.

Another feature of the DALI controller used in DALI protocol networks is that the controller supplies power to all devices on the network, as well as control and query commands. One drawback of this arrangement is observed if the DALI controller fails, meaning the loss of the power bus as well as the command/control bus. Accordingly, if the controller fails, the entire lighting system will be non-functional.

Another operation for the DALI protocol that tends to reduce response time is the polling of devices in the DALI bus. For example, if an occupancy sensor is to be used to turn on a ballast through the DALI network, the DALI controller polls the sensors in the DALI network to determine when an event occurs to indicate a change in the occupancy of a room, meaning the associated ballast should be energized. The process for polling the devices on the DALI bus can be somewhat time intensive, because polling commands may be supplied for each device on the DALI bus in a cyclical fashion, so that the latency for a given occupancy sensor to indicate a change in status may be significant. In effect, the control for the entire DALI network is centralized through the DALI controller, so that control is effected through processing and communication from a central point.

Another aspect of devices that are used on a DALI network is the fact that the components must include communication ports for connection to the DALI bus, and be able to communicate with a DALI controller. Accordingly, the devices are inherently more complex than traditional devices that are not connected to a network. The complexity of the components can significantly increase the cost of a DALI controlled lighting network.

SUMMARY OF THE INVENTION

In accordance with one aspect of the present invention, a protocol is used with a conventional DALI network lighting system that extends the capability of the system to permit greater functionality and flexibility. Preferably, the conventional DALI command word supplied on the DALI network is expanded to three bytes, and two additional bits, conventionally placed at the end of a message and referred to as "stop bits," and used to indicate the end of a DALI message, are toggled to increase the functionality of the conventional protocol. In the conventional DALI protocol, the last two bits of a message are set to be floating to indicate the end of a DALI message. When either of the last two bits are made to transition, rather than float, the devices interpret the data received according to the extended, increased functionality protocol thereby increasing the functionality and flexibility of the lighting system.

Thus, the protocol of the present invention operates in a conventional DALI system, because conventional DALI messages can also be provided on the DALI network to communicate with conventional DALI devices. When an extended protocol message is transmitted on the network, any conventional DALI devices, i.e., those that are not configured to interpret messages sent using the extended protocol, ignore the message due to the transitions in the final 2 bits of the message. More particularly, those devices that are capable of only receiving DALI protocol messages ignore messages that are formatted according to the extended protocol. However, those devices according to the present invention which are capable of receiving and interpreting an extended protocol message function accordingly.

Either of the final 2 bits in the message may be transitioned to signal the extended protocol is being employed, effectively increasing the number of messages available on the conventional DALI bus. No new wiring or changes to the DALI bus or controller are needed to implement the protocol or to add new functionality to existing systems. In addition, the reserved DALI commands are not needed to extend the functionality and flexibility of the lighting network system, so that conflicts between devices made by different manufacturers are not an issue. In accordance with a feature of the present invention, a transition in either of the final 2 bits causes the message to be ignored by conventional DALI devices, so that additional transitions are available to expand the amount of data communicated in a message. For example, when an extended protocol message is transmitted, the final 2 bits of a conventional DALI message are toggled, as well as an additional number of message bits to form an extended message within an appropriate time frame to prevent interference while expanding the functionality of the system. Devices according to the invention tied to the DALI bus can easily be programmed to received both conventional DALI messages and extended protocol messages, effectively increasing the flexibility of the network by permitting greater system functionality provided by the extended protocol messages. If a conventional DALI message is targeted for a device capable of responding to both the conventional DALI protocol and the extended protocol, the device will interpret the conventional DALI message appropriately by recognizing the lack of a transition in the final 2 bits of the DALI message. Similarly, the device will recognize an extended protocol message when a transition is detected in either of the 2 final bits of an extended protocol message.

In accordance with a feature of the present invention, a network of devices may include 256 devices, rather than the conventional 64 in the DALI protocol. In addition, the extended protocol permits the definition of groups within the lighting network, so that sets of devices can respond as a single unit, rather than having to communicate with each individually. For example, a set of devices can be programmed to be within a given group, with appropriate default set points for the group. When an extended protocol message is received to cause the group to return to a default, all the devices in the group can return to the given set point.

In accordance with another feature of the present invention, the power and control can be separated or distributed, so that the failure of a given controller does not cause the entire network to fail. Each device on the network can be enabled with the extended protocol to act as a sender or receiver, i.e., controller, with power supplied to each device individually. Accordingly, the intelligence of the system according to the invention is distributed amongst the individual devices, i.e., the individual ballasts that include processing power. Therefore, if the central DALI controller fails, the system still retains functionality.

Further, the network wiring need only be for communication, rather than for communication and power. The extended protocol network can be realized as a two wire system, which can fall into a class 2 category for electrical standards, meaning that no conduit is needed for running the wires. In the conventional DALI system, power lines and control lines are provided to each device, so that the wiring is in a class 1 category, indicating the need for a conduit to run the wire to the various devices.

In accordance with another feature of the present invention, control for the network can be decentralized, meaning that each device on the network can include some intelligence to operate various devices connected to it, in addition to having an interface for connecting to an extended protocol network. Such a system permits greater flexibility and faster responsiveness due to the lack of a centralized control that polls all the devices in the network on a cyclical basis. For example, an occupancy sensor and a ballast in a given room can be connected to each other so that a signal from the occupancy sensor immediately turns on the ballast, rather than waiting for a polling command from the central DALI controller. Either of the devices, for example, the occupancy sensor or the ballast can be configured to have an interface for the extended DALI protocol network. In a standard DALI system, if the controller fails, because the polling operation stops, the ballasts would not respond to an occupancy sensor. This is because in the conventional DALI system, the sensor input is provided to the controller, and the controller must then instruct the ballast. If the controller fails, then the ballast will not receive instructions to turn lights on or off.

According to another advantage of the present invention, maintenance of a lighting system using the extended protocol system is more efficient and more easily achieved due to the localized rather than centralized control. One type of advantage contemplated in accordance with the present invention is an additional controller that can be attached to the extended DALI protocol network to act as a peer to peer controller to provide a gate keeping function between various devices on the network. In such a configuration, peer to peer operations increase responsiveness in the DALI lighting system to provide greater functionality and flexibility for the entire system.

Other features and benefits of the present invention are realizable by the combination of individual ballasts that include processing power, and the configuration of the ballasts to utilize the extended DALI protocol. For example, ballasts are configured in a default "out-of-box" mode to perform various functions upon installation and without additional configuration and setup. More particularly, a ballast is configured with a photosensor input and broadcasts its sensor data over the shared interface automatically. Further, ballasts are configured upon installation without configuration to function as a standard DALI ballast such that information that is broadcast over a DALI compatible communication link is automatically received by an "out-of-box" ballast that has not yet been "commissioned" (i.e., configured with an address and various programming instructions).

Yet another feature of the present invention is that commissioning of the distributed system is greatly simplified. Assigning an address to a ballast installed on a DALI communication link can be performed in various ways, including by entering commands on a keypad, using an infra-red transmitter to send commands to an infra-red receiver input on a ballast, and by transmitting commands using another device having a processor and memory, such as a properly configured power supply and/or controller device.

Further, the present invention improves the commissioning of replaced ballasts. In one embodiment, for example, a database is referenced that stores configuration information for every ballast on a communication link. After a replacement ballast is added to the database, any configuration information relating to the replaced ballast is automatically assigned to the replacement ballast. In this way, a plurality of ballasts that replace faulty ballasts can be commissioned quickly and accurately.

Yet another benefit of the present invention includes the use of programming routines that can be used, for example, by a single ballast that is configured to receive sensor readings from a plurality of photocells, and, thereafter to average and broadcast the averaged readings to other devices on the link. Thus, for example, a ballast can provide an accurate representation of the amount of light that is produced from a single lamp or plurality of lamps and from another source, such as natural sunlight.

Another feature of the present invention includes scaling input values to accommodate various operation range limitations of the installed ballasts. For example, one ballast that has a range of operation that is smaller than another ballast receives an input command that is scaled to factor into consideration the limitations of the ballast's range of operation. By scaling input values for various devices on the communication link, the present invention improves accuracy, for example, with respect to commands sent and received by various ballasts.

The present invention also provides for a process of seasoning or "burn-in" of lamps to prevent a decrease in lamp life that is caused by dimming a lamp too early after a lamp is first installed. In accordance with the present invention, ballasts are configured in "out-of-box" mode to automatically supply a lamp with full power for a minimum amount of time, such as 100 hours. Further, the ballast is preferably configured to ignore commands issued from any device on the communication link that may interrupt the burn-in process, such as a command to dim. Thus, another benefit of the present invention is help assure that lamp life will not be decreased due to dimming the lamp before it has been properly "seasoned."

Other features and advantages of the present invention will become apparent from the following description of the invention that refers to the accompanying drawings.

DETAILED DESCRIPTION OF THE PREFERRED EMBODIMENTS

System Overview

Figure 1:
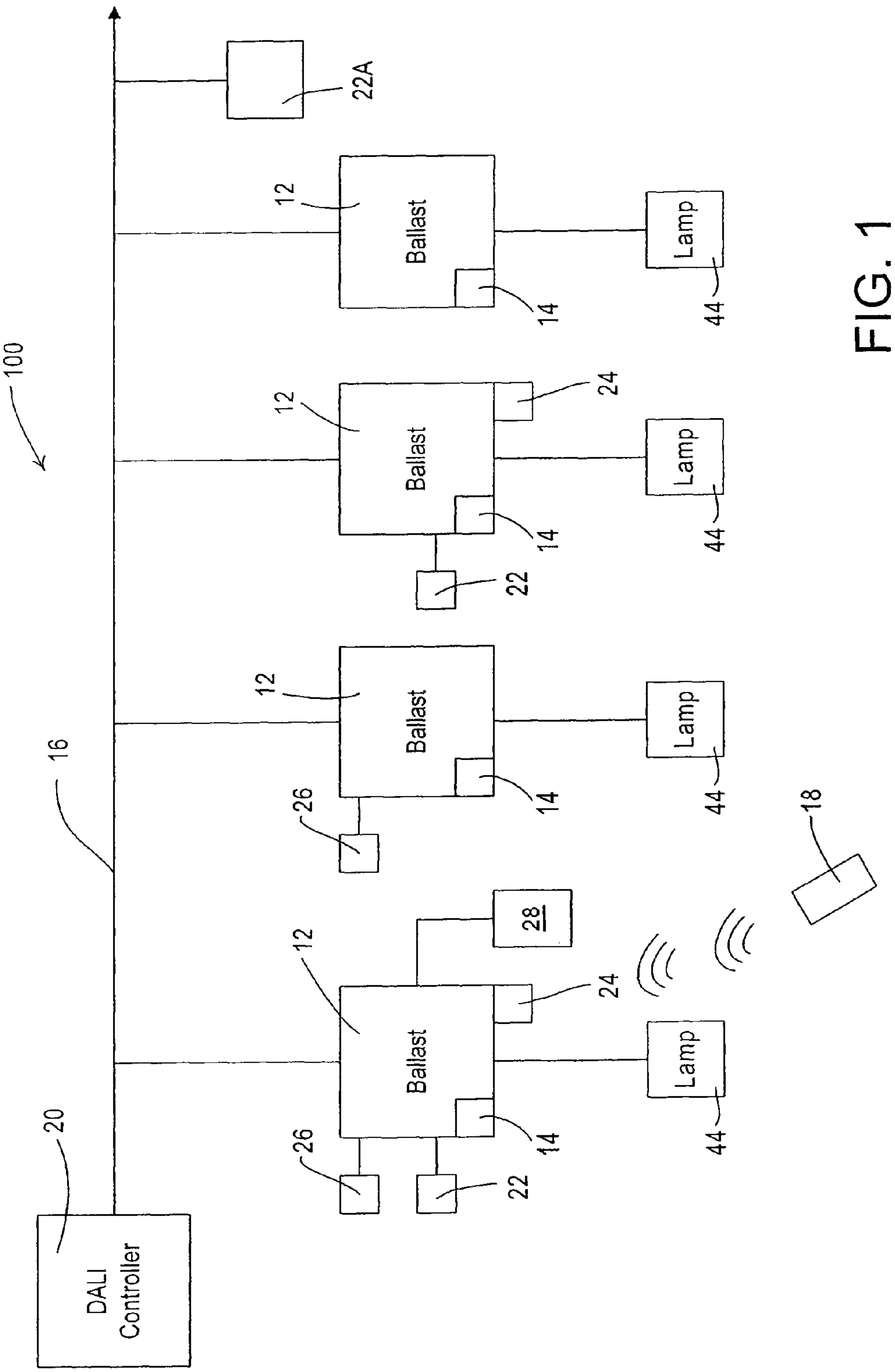
FIG. 1 is a diagram of a distributed ballast system 100 in accordance with an exemplary embodiment of the present invention.

Referring to the drawing figures, in which like reference numerals refer to like elements, FIG. 1 is a diagram of a distributed ballast system 100 in accordance with an exemplary embodiment of the present invention. As shown in FIG. 1, a plurality of ballasts 12 that comprise processors 14 are installed on a communication link 16, preferably a DALI communication link. Coupled to each ballast is a lamp or lamps 44, and some or all of the ballasts 12 have sensors attached thereto. For example, photocell sensors 22 and occupancy sensors 26, as well as infrared receivers 24 are shown attached to some ballasts 12. Also as shown in FIG. 1, at least one ballast is provided that has no sensor input, and at least one photosensor 24A is provided that is attached to link 16 as a stand alone device. Thus, devices are provided on communication link 16 in various combinations.

The DALI communications link 16 is bi-directional, and an incoming signal can comprise a command for a ballast 12 to transmit data about the current state or history of the ballast's operation via the link. The ballast can also use the DALI communications link 16 to transmit information or commands to other ballasts that are connected to that ballast.

By utilizing the ballast's ability to initiate commands to other ballasts, multiple ballasts can be coupled in a distributed configuration. For example, a first ballast can receive a command from an infrared (IR) transmitter 18 via the first ballast's IR receiver 24 to turn off all lamps 44 of the system 100. This command is transmitted to other ballasts 12 in the system 100 via the DALI communications link 16. In another embodiment, the ballasts 12 of the system 100 can be coupled in a master-slave configuration, wherein a master ballast receives one or more signals from a central controller 20 or from a local control device such as control station 28, and sends a command or commands to other ballasts 12 to control the operation of their respective lamps 44, or to synchronize the operation of the other ballasts 12 with the master ballast.

The master ballast may also send commands and/or information pertaining to its configuration to other control devices, such as central controllers 20. For example, the master ballast may send a message containing its configuration to other controllers 20 and/or ballasts 12 indicating that it reduced its light output power by 50%. The recipients of this message (e.g., slave devices, local controllers, central controllers) could independently decide to also reduce their respective light output power by 50%. The phrase lighting loads includes fluorescent lamps, other controllable light sources, and controllable window treatments, such as motorized window shades. The central controller may be a dedicated lighting control, such as a DALI controller 20, as shown, or may also comprise a building management system, A/V controller, HVAC system, peak demand controller and energy controller.

In an exemplary embodiment of the system 100, each ballast 12 is assigned a unique address, which enables other ballasts and/or a controller to issue commands to specific ballasts. The IR receiver 24 on each ballast can be utilized to receive IR message containing a numeric address that is loaded into a memory of the ballast 12. Also, the IR message can serve as a means to “notify” a ballast that the ballast should acquire and retain an address that is being received on a digital port connected to the DALI communication link 16. Generally, a port comprises interface hardware that allows an external device to “connect” to the processor. A port can comprise, but is not limited to, digital line drivers, opto-electronic couplers, IR receivers/transmitters, RF receivers/transmitters. As known in the art, an IR receiver is a device capable of receiving infrared radiation (typically in the form of a modulated beam of light), detecting the impinging infrared radiation, extracting a signal from the impinging infrared radiation, and transmitting that signal to another device. Also, as known in the art, an RF receiver can include an electronic device such that when it is exposed to a modulated radio frequency signal of at least a certain energy level, it can respond to that received signal by extracting the modulating information or signal and transmit it via an electrical connection to another device or circuit.

As described above, each of the multiple control inputs of each processor 14 is capable of independently controlling operating parameters for the ballast 12 in which the processor 14 is contained, and for other ballasts in the system 100. In one embodiment, the processor 14 implements a software routine, referred to as a set point algorithm, to utilize the information received via each of the input terminals, their respective priorities, and the sequence in which the commands are received. Various set point algorithms are envisioned. As shown in FIG. 1, each ballast 12 need not have a sensor input. A ballast need not have any sensor inputs, or it may have one sensor inputs, or it may have any combination of sensor inputs.

The ballasts and thus the lamps can be controlled by the optional controller 20, by the individual ballast input signals from the sensors and dimmers, or a combination thereof. In another embodiment, the optional controller is representative of a building management system coupled to the processor controlled ballast system via a DALI compatible communications interface 16 for controlling all rooms in a building. For example, the building management system can issue commands related to load shedding and/or after-hours scenes.

An installation of several ballasts and other lighting loads can be made on a common digital link 16 without a dedicated central (or “master”) controller 20 on that link. Any ballast 12 receiving a sensor or control input can temporarily become a “master” of the digital bus and issue command(s) which control (e.g., synchronize) that state of all of the ballasts and other lighting loads on link 16. To insure reliable communications, known data collision detection and re-try techniques can be used.

Figure 2:
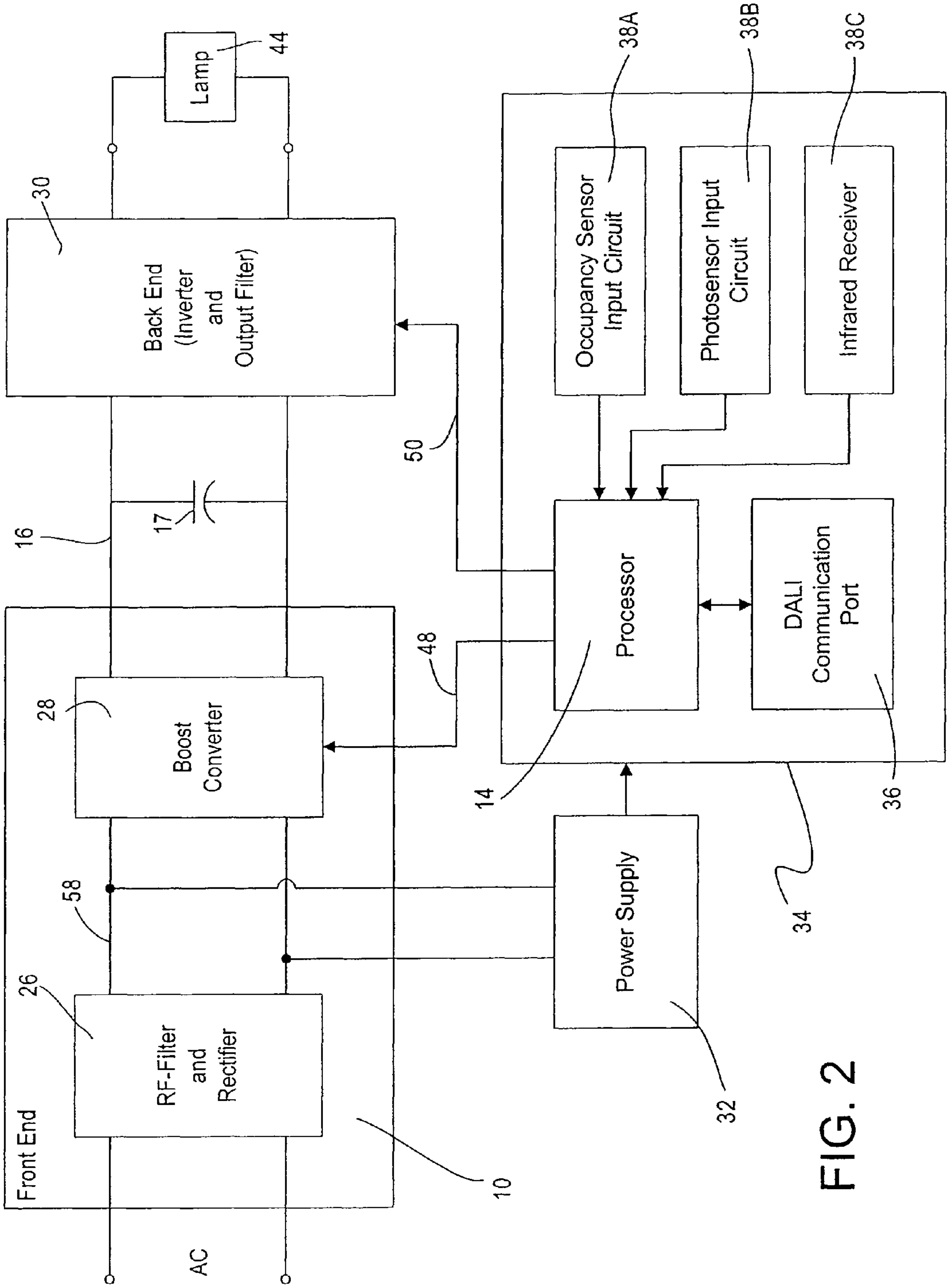
FIG. 2 is a block diagram of a multiple-input ballast having a digital processing circuit 14 in accordance with an exemplary embodiment of the present invention.

FIG. 2 is a block diagram of a multiple-input ballast 12 having a processor 14 in accordance with an exemplary embodiment of the present invention. As shown in FIG. 2, ballast 12 comprises a front end or input circuit 10 comprising a rectifying circuit 26 and a boost converter circuit 28, a back end or output circuit 30 comprising an inverter circuit and an output filter circuit, and a digital processing circuit 34. Processing circuit 34 includes a processor 14, a DALI communication port 36, an occupancy sensor input circuit 38A, a photosensor input circuit 38B, and an IR receiver 38C. A power supply 32 provides power to processing circuit 34. The back end 30 of the ballast 12 drives the gas discharge lamp 44 in accordance with back end control signal 50 from the processor 14. Although depicted as a single lamp 44 in FIG. 2, the ballast 12 is also capable of driving a plurality of lamps. To better understand the ballast 12, an overview of the ballast 12 is provided below.

As shown in the exemplary embodiment depicted in FIG. 2, the rectifying circuit 26 of ballast 12 is capable of being coupled to an AC (alternating current) power supply. Typically the AC power supply provides an AC line voltage at a specific line frequency of 50 HZ or 60 Hz, although applications of the ballast 12 are not limited thereto. The rectifying circuit 26 converts the AC line voltage to a full wave rectified voltage signal 58. The full wave rectified voltage signal 58 is provided to the boost converter 28. The boost converter circuit 28 boosts the rectified AC voltage 58 to a boosted DC voltage level and supplies the boosted voltage to a DC bus 16 across which a bus capacitor 17 is disposed. The boosted DC voltage is provided to an inverter circuit of the back end 30. The back end 30 converts the boosted voltage to a high-frequency AC voltage to drive the gas discharge lamp 44.

The power supply 32 is coupled to the output of the RF filter and rectifier 26 to provide power to the processing circuit 34. The processor 14 can comprise any appropriate processor such as a microprocessor, a microcontroller, a digital signal processor (DSP), or an application specific integrated circuit (ASIC). Further, a program can be stored in a memory residing within the microprocessor, in external memory coupled to the microprocessor, or a combination thereof. The program is recognizable by the microprocessor as instructions to perform specific logical operations. The processor 14 is coupled to the DALI communication port 36 that allows for the transmission and receipt of messages on the DALI link 16. The occupancy sensor input circuit 38A allows for an external occupancy sensor to be connected to the ballast. Control signals from the occupancy sensor are transmitted to the processor 14. The photosensor input circuit 38B receives a control signal from a photosensor and communicates the photosensor reading to the processor 14. The infrared receiver 38C receives infrared signals from the infrared transmitter 18 and relays the signals to the processor 14.

In one embodiment, the processor 14 performs functions in response to the status of the ballast 12. The status of ballast 12 refers to the current condition of the ballast 12, including but not limited to, on/off condition, running hours, running hours since last lamp change, dim level, operating temperature, certain fault conditions including the time for which the fault condition has persisted, power level, and failure conditions. The processor 14 comprises memory, including non-volatile storage, for storage and access of data and software utilized to control the lamp 44 and facilitate operation of the ballast 12. The processor 14 processes the received signals from the DALI communication port 36, the occupancy sensor input circuit 38A, the photosensor input circuit 38B, and the infrared receiver 38C, and provides processor output signal 50 to the inverter circuit 30 for controlling the gas discharge lamp 44. In one embodiment, the inputs to the ballast, via the DALI communication port 36, the occupancy sensor input circuit 38A, the photosensor input circuit 38B, and the infrared receiver 38C, are always active, thus allowing the inputs to be received by the processor 14 in real time. The processor 14 can use a combination of present and past values of the inputs and computational results to determine the present operating condition of the ballast.

DALI/Extended Protocol

In the standard DALI protocol, as previously described, messages are formatted with a start bit, two bytes of data, comprising 8 bits of address data followed by 8 bits of command data and two stop bits. The DALI protocol is implemented using Manchester encoding, in which a bit of information is communicated by a positive-going or negative-going transition of the control signal within a timing interval. For example, a "logic high" (or a bit having a value of '1') results from the control signal changing from the low state (of zero volts) to the high state of the DALI link (approximately 18 volts) within the timing interval. Similarly, a "logic low" (or a bit having a value of '0') results from a control signal changing from the high state to the low state within the timing interval. One skilled in the art would understand the fundamentals of Manchester encoding.

The two "stop bits" signal the end of a DALI message, and are two "idle high bits". The idle state of the DALI link (when no devices are communicating) is the high state (of 18 volts). At the end of a DALI message, the device receiving the message waits for the two "idle high bits", when the DALI link must be maintained high for the duration of two timing intervals. Note that since the message is not changing levels during the time intervals, no data is being communicated.

However, as described previously, the standard DALI system does not provide sufficient functionality and flexibility to control a more complex system having increased functionality, such as described above with respect to system 100. Thus, in order to support the increased functionality described herein, an extended, fully DALI compatible protocol is provided.

As noted above, a standard DALI message includes 19 bits: one control bit indicating a start of a message, plus two bytes comprising address and message content, plus two "stop bits" that indicate the end of a DALI message. The extended DALI protocol of the present invention is configured to extend the standard DALI protocol in at least two ways. First, the size of any message using the extended DALI protocol that is transmitted over communication link 16 and that originates from any extended DALI protocol compatible device is expanded from two bytes (plus the three control bits), to three bytes (plus the three control bits). By providing an additional 8 bit component to a message, a significant increase in the amount of information content transmitted between devices can be provided, thus increasing functionality. Examples of such increased content and associated functionality are provided below.

Figure 3:
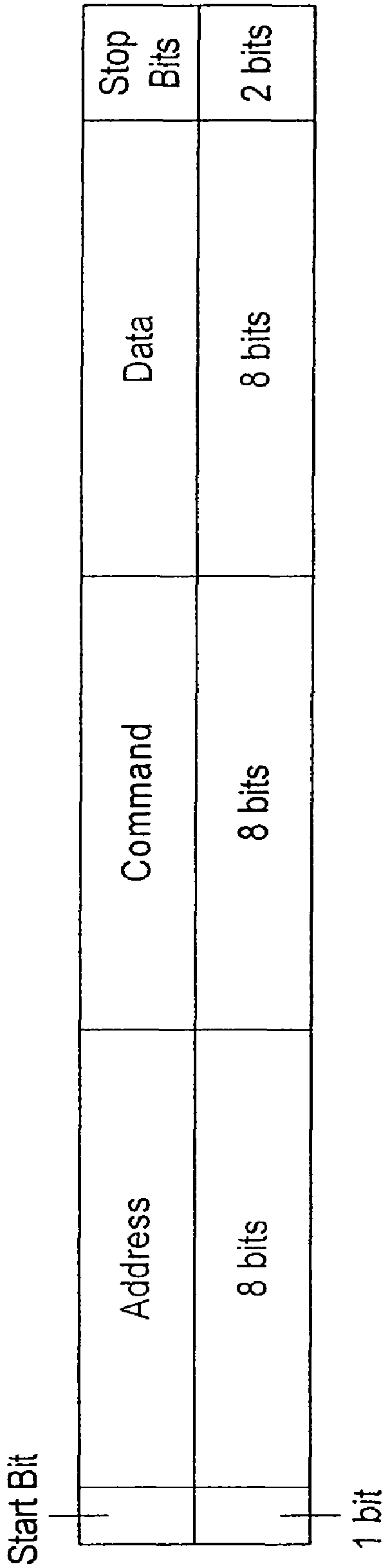
FIG. 3 illustrates an example message in accordance with the extended protocol of the present invention.

FIG. 3 illustrates the structure of a three byte message in accordance with the extended protocol of the present invention. As shown in FIG. 3, the first bit is a start bit, followed by the first 8-bit byte representing the device address. The second message byte is a command byte that includes information on what type of device is issuing the message and what the actual command is. The third address byte comprises the device data, which might be data to store to memory or data that is important in executing the command from the previous byte of the message. The last two bits are "stop bits" that define the end of the message.

As a second way to extend the DALI protocol, the two "stop bits" at the end of the message are provided in a different state than the two "idle high bits" of the standard DALI protocol. A standard DALI compatible device is not configured to recognize any message that does not comply with both stop bits being set in an "idle high" state. DALI compatible devices that are configured to recognize the extended protocol of the present invention, however, are signaled to receive and interpret extended protocol messages because the two "stop bits" have a state other than two "idle high" time intervals. For example, the "stop bits" for a message of the extended protocol might be two "idle low" time intervals, where the transmitting device drives the link low for two complete time intervals. Or the "stop bits" might be one "idle low" time interval followed by one "idle high" time interval, or vise versa.

Thus, as described above, the present invention enables devices compatible with the extended protocol to receive and interpret much more information over communication link 16 than previously available. The increase in message length from two bytes to three bytes, enables a substantial increase in the amount of information that can be transmitted over communication link 16. Thus, the extended DALI compatible protocol of the present invention affords a significant increase in functionality, such as to support complex lighting control systems in a variety of physical environments.

Examples of increased functionality that results from the extended protocol of the present invention are as follows. Ballasts 12 that are compatible with the extended protocol can are capable of transmitting and receiving input readings from various sensor devices, such as photocell sensors, occupancy sensors and infrared devices across the DALI link. Moreover, ballasts 12 can be configured to broadcast and receive sensor data from one or more selected devices over communication link 12. Ballasts 12 are also configurable to be associated with particular groups of devices (e.g., other selected ballasts, photocells, keypad controls, etc.), thereby increasing the configuring of various scenes and lighting control combinations. Also, multiple wallstations can be used to control the system, since a ballast can broadcast local data to the rest of the system 100.

In addition to the above described benefits, the increased message size provided by the extended protocol and distributed intelligence provided by processors 14 in ballasts 12 reduces the prior art need for polling ballasts from a central controller 20 in order to issue commands thereto. This functionality greatly improves the efficiency and response time of system 100. Processes associated with polling can, if desired, be limited in accordance with the present invention to standard DALI functions and to only occasional communication between a master controller 20 and a ballast 12, for example, to ensure that ballast 12 is functioning. Of course, one skilled in the art will recognize that any ballast functioning as controlling device can poll another device to ensure that device is functioning within normal operating parameters. In fact, improved diagnostics are made possible by the extended protocol, for example, by setting a least significant bit to indicate operational status information.

Other features that are directly attributable to the extended protocol include processes and algorithms that can be employed to perform various tasks. For example, tasks associated with scaling and averaging (described in detail, below) are made possible by the increase in message size supported by the extended DALI protocol.

The protocol of the present invention is backward compatible and operates in a conventional DALI system. In effect, conventional DALI messages can be provided on the DALI network to communicate with conventional DALI devices. When an extended protocol message is transmitted on the network, any conventional DALI devices that are not configured to interpret messages sent using the extended protocol simply ignore the message due to the states of the stop bits. Devices according to the present invention which are capable of interpreting an extended protocol message receive and interpret the extended protocol message and function accordingly.

Also, no new wiring or changes to the DALI bus or controller are needed to implement the protocol or to add new functionality to existing systems. The network wiring need only be for communication, rather than for communication and power. The extended protocol network can be realized as a two wire system, which can fall into a class 2 category for electrical standards, meaning that no conduit is needed for running the wires. In the conventional DALI system, power lines and control lines are provided to each device, so that the wiring is in a class 1 category, indicating the need for a conduit to run the wire to the various devices.

Further, devices according to the invention and tied to the DALI bus can easily be programmed to receive both conventional DALI messages and extended protocol messages, effectively increasing the bandwidth of the network by permitting greater throughput of data in the extended protocol messages.

In accordance with a feature of the present invention, a network of devices may include 256 devices, rather than the conventional 64 in the DALI protocol. Also, the power and control of communication link 16 can be separated or distributed, so that the failure of a given controller does not cause the entire network to fail. Each device on the network can be enabled with the extended protocol to act as a sender or receiver, i.e., controller, with power supplied to each device individually. Accordingly, the intelligence of the system according to the invention is distributed amongst the individual devices, i.e., the individual ballasts that include processing power. Therefore, if the central DALI controller fails, the system still retains functionality.

A discussion of specific details with respect to the extended protocol, including specific settings of various bits, is now provided.

As described above, the extended protocol of the present invention is an extension of the standard DALI protocol version 1.0 as defined in Annex E and F of IEC60929 Ed2 2003. According to the present invention, the extended protocol of the present invention preferably employs Manchester bit encoding, and transmits at a baud rate of 1200 BPS, with an individual bit time of 833.3 microseconds.

Preferably, additional commands are provided with the same or similar structure as DALI commands with at least the following exceptions. In accordance with a preferred embodiment of the extended protocol, forward frame commands are three bytes long (a backward or reply frame is one byte and has the same timing requirements as defined in standard DALI).

According to the present invention, the timing of forward frame transmission (formatted in three bytes) is subject to a randomized delay to prevent repeated collisions. When the devices on DALI link 16 start to broadcast, both DALI and extended protocol messages are likely to collide with the broadcasts. Therefore, on an extended DALI protocol link both DALI and extended protocol messages are preferably subject to collision handling requirements. Preferably, timing depends on the priority of a message, i.e., high priority or low priority. High priority messages have a relatively short inter-message time delay that ensures that, in case of a collision, they are transmitted first. Low priority messages have a longer inter-message time delay.

In the extended protocol of the present invention, the first of two end "stop bits" is provided as an "idle low" state. The second "stop bit" provided as an "idle high" state. The extended protocol prevents multiple collisions using two techniques: 1) synchronization to the last low to high transition on the link 16 (between the first and second "stop bit"), which usually results in loss-less collisions; and 2) random message delay which minimizes likelihood of repeated collisions.

More particularly, in accordance with the extended protocol of the present invention, a forward frame delay comprises a fixed portion and a randomized portion. An extended protocol responsive device provides random delay by generating a random number in the range of 0-7. The randomized portion of the message delay is preferably divided into 16 discrete time slots, wherein each time slot is ½ bit time (416.67 usec) long. Eight slots are allocated for each message priority level.

An extended protocol responsive device with a pending high priority extended protocol message is directed to wait between 11.27 microseconds and 14.18 microseconds (0-7 time slots) before the start of transmission. This time delay is measured from the last occurrence of a confirmed low level on the link. Furthermore, each device with a pending low priority extended protocol message must wait between 14.6 microseconds and 17.51 microseconds before the start of transmission. Thus, high priority messages (such as generated from a ballast having an occupancy sensor input) have a shorter delay and are transmitted before low priority messages.

In accordance with a preferred embodiment, a transmitting device detects collision during the high level portion of each Manchester encoded bit. If a low logic state is found on the link when the device is trying to transmit a high logic state, the current transmission is interrupted immediately. In case of a collision, the transmitting device re-initializes the delay timer by selecting a different random slot count, and the pending message is resent as usual when the link is determined to be free.

In accordance with high priority messages, a sensor broadcasts user input commands with critical response time requirements. In accordance with low priority messages, the configuration commands originate from the controller, as the controller is able to implement more sophisticated error checking and re-try schemes.

The extended protocol of the present invention dramatically increases functionality and improves efficiency with respect to communication between devices on a DALI communication link. As will be clear to one skilled in the art, virtually every improvement over prior art DALI functionality, described herein, utilizes the extended protocol in some way.

Out-of-Box Mode

In a preferred embodiment of the present invention, ballasts 12 are pre-configured to perform various functions upon installation and without the need for additional configuration and setup. In this way, the ballasts 12 will operate under a set of default conditions when they are installed "out-of-box" and will operate in accordance with these default conditions until configured, as described herein.

As used herein, the term, "out-of-box" refers, generally, to the state of ballast 12 upon manufacture. An installed ballast will be in out-of-box mode if it has not been configured upon installation. The out-of-box mode represents a default configuration of the ballast upon initial installation assuming no other instituted configuration. The out-of-box mode includes the following functionality: receiving and broadcasting photosensor status and data over the DALI communication link 16, as well as averaging the readings of photosensor 22, scaling target input levels, and performing automatic burn-in functions. Details of each of these functions are provided below.

Upon manufacture, ballast 12 is preferably configured with a unique identifier or serial number, such as an alpha-numeric code, which can be used to distinguish one ballast from another. The unique alpha-numeric code identifies a particular ballast 12, and after the ballast 12 is commissioned into the lighting system, the ballast is further assigned a unique DALI address on the DALI communication link 16.

As noted above, in a preferred embodiment of the present invention, ballast 12 may have a photosensor 22 coupled thereto, and the ballast is configured in its out-of-box mode to broadcast photosensor 22 status and other attached sensor data over the DALI communication link 16. Further, a ballast in out-of-box mode will receive and process all broadcast information, such as sensor status information, that is transmitted over the DALI communication link 16. In the event that no photosensor 22 is attached to ballast 12, then the ballast functions as a conventional DALI ballast.

As noted above, in accordance with the present invention, the ballasts 12 can operate over DALI communication link 16 without the need for a dedicated central controller 20 being present on that link. Accordingly, some out-of-box functionality relates to the extended protocol, described above, and some relates to the hardware capabilities of ballasts 12. For example, each ballast 12 may physically connect to a particular group of devices, including a sensor device, a lighting load, and other ballasts 12 over communication link 16. Ballasts 12 are preferably configured in the out-of-box mode to broadcast to and listen to all other devices on the DALI link 16 in order that various information (e.g., status information regarding photosensors, occupancy sensors, infrared devices or other types of sensors) can be shared over the DALI link. Furthermore, other processing algorithms, such as averaging photosensor data, performing ballast range scaling and automatic burn-in processes (described below) can be configured for out-of-box functionality in every DALI compliant device in the system.

By providing such functionality in an out-of-box configuration, the amount of time and resources required to configure a DALI lighting control system is dramatically reduced.

Automatic Burn-In with Pause Functionality

In accordance with a preferred embodiment of the present invention, ballasts 12 are configured in out-of-box mode to automatically perform steps associated with seasoning or "burn-in" of new (unused) lamps before a dimming function of the lamp can be enabled. It has been determined that seasoning a lamp, for example, by operating a fluorescent lamp at full light output for a period of about 100 hours before dimming, helps to assure that the maximum lamp life is achieved. Methods associated with seasoning lamps are described in U.S. Pat. No. 6,225,760, assigned to the assignee of the present patent application, and incorporated herein by reference.

The present invention preferably includes providing ballast 12 with an automatic burn-in mode when a ballast 12 is first installed. Thus, for example, after a ballast is physically installed on a DALI communication link 16 and a lamp 44 is attached thereto, the ballast operates the lamp at full light output for a minimum amount of time, such as 100 hours. Ballast 12 is preferably configured with a timing algorithm to monitor the elapsed time during the burn-in process.

In addition to executing the steps associated with burn-in methods, as described above, ballast 12 is preferably configured to block any messages or commands from any device on the DALI communication link that may interrupt or otherwise interfere with the burn-in process, including commands for dimming a lamp 44. For example, when a new lamp and ballast 12 are installed on a DALI communication link 16, the ballast lamp will automatically command the lamp 44 to season, and ballast 12 maintains the lamp seasoning process by ignoring the commands received from other devices on the link. One skilled in the art will recognize that ballast 12 can be configured to enable one or more remote commands, even though such commands may interrupt or interfere with the burn-in process. Thus, ballast 12 is configurable to override one or more default out-of-box settings that are provided with ballast.

Also, ballast 12 is preferably configured to pause the burn-in process during commissioning (e.g., assigning a DALI address and configuring the ballast). For example, after ballast 12 is installed and connected to a gas discharge lamp 44, ballast 12 enters its automatic burn-in mode and proceeds to supply lamp 44 with full power. Thereafter, as additional ballasts 12 are installed, each automatically enters automatic burn-in mode and proceeds to power each respective lamp 44 at full power. While ballasts 12 and lamps 44 are installed, a user of system 100 may send a command to the ballast via control station 28 or infrared transmitter 18 to cause the ballast to pause the burn-in process and then proceed to commission each ballast to function in accordance with a desired configuration. In accordance with the present invention, ballast 12 tracks the elapsed burn-in time. After the ballast is commissioned, the user ends the pause of the burn-in process and the ballast 12 resumes the burn-in process for the remaining required burn-in time. In this way, ballasts 12 can be commissioned at any time during a burn-in process, and lamps 44 are not adversely affected since dimming commands, known to shorten lamp life, are blocked or otherwise not received by ballast 12 until the automatic burn-in process is complete.

Figure 4:
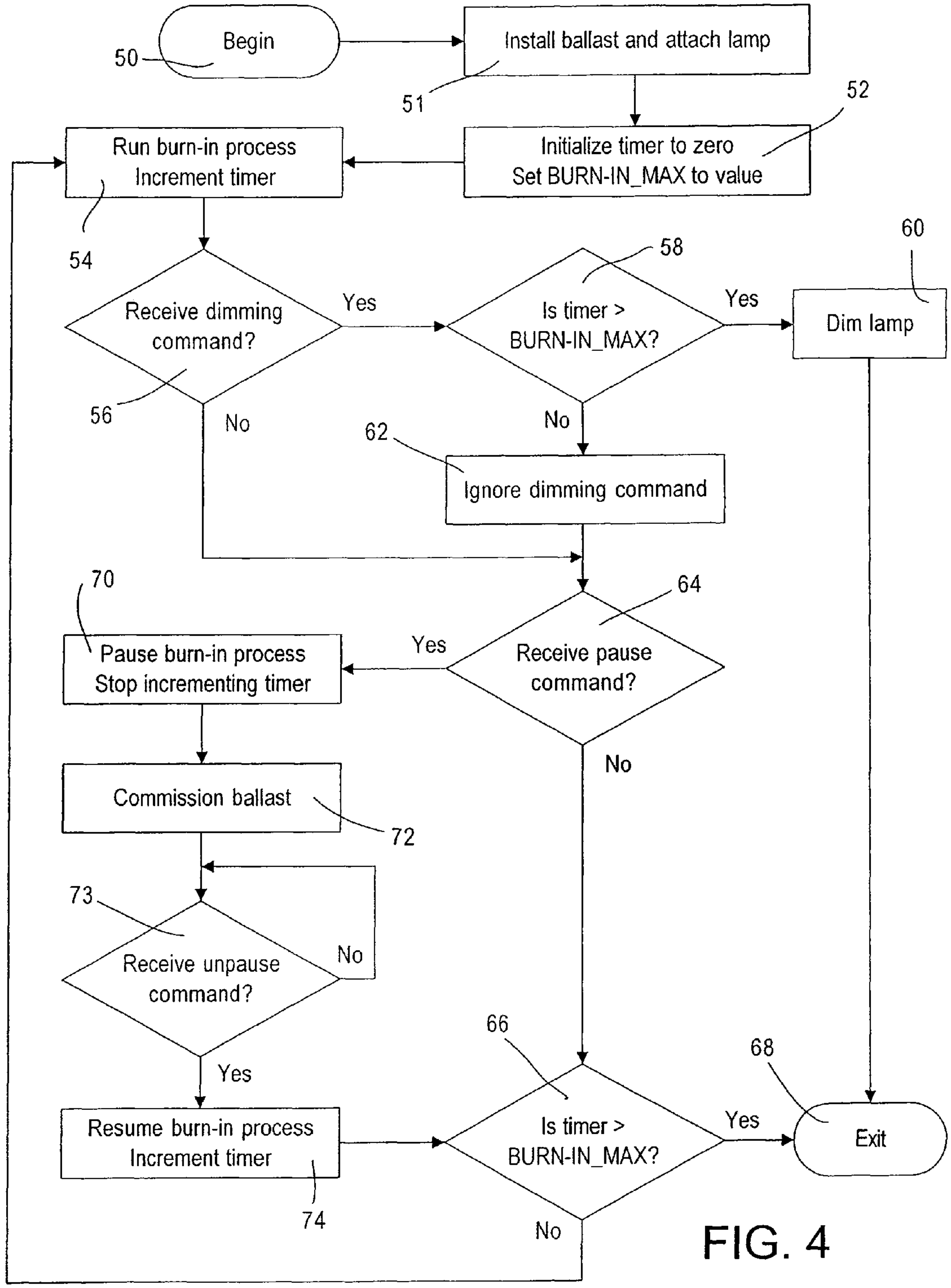
FIG. 4 is a flow chart that includes example steps associated with the burn-in process of the present invention.

FIG. 4 is a flowchart that includes example steps associated with the burn-in process of the present invention. Referring to FIG. 4, at step 50 a ballast 12 is installed and attached to a lamp 44 on a communication link 16. At step 52, a value representing the amount of time to season a lamp is assigned to a variable, BURN-IN_MAX. Also at step 52, a timer value representing the amount of time that passes during the burn-in process is initialized to zero. Thereafter, at step 54, the burn-in process commences and the timer variable increments as time passes.

Continuing with the flowchart shown in FIG. 4, at step 56, a determination is made whether a command to dim the lamp has been received, for example, from a remote ballast or other controlling device. If such command is received, at step 58, a determination is made whether the value of the timer variable is greater than the value of BURN-IN_MAX, thereby indicating that the seasoning process of the lamp is complete. If so, then the burn-in process is deemed to be complete and, at step 60, the ballast dims the lamp in accordance with the received command. Thereafter, the process branches to step 68 and the process ends. Alternatively, if the determination at step 58 is that the timer value is less than the value of BURN-IN_MAX, then at step 62 the ballast ignores the command to dim received from the remote device.

At step 64 (FIG. 4), a determination is made whether a command to pause the burn-in process has been received. If not, the process branches to step 66 and a comparison of the values of the timer variable and the BURN-IN_MAX variable is made.

If the value of the BURN-IN_MAX variable exceeds the value of the timer variable, then the burn-in process is not complete and the process loops back to step 54. Alternatively, if the burn-in process is complete (indicated by the value of the timer variable being greater than the value of BURN-IN_MAX), then the process ends at step 68. If, in the alternative, a command to pause the burn-in process is received by the ballast (step 64), then the process branches to step 70 and the burn-in process is paused for commissioning to occur. Moreover, the process associated with incrementing the timer variable is also paused.

At step 72, the ballast is commissioned to be configured with various settings in accordance with the teachings herein. For example, the ballast is assigned an address and configured to receive commands from a defined group of devices broadcasting over communication link 16. After the commissioning process is complete, the process continues to step 73, where a determination is made whether a command to unpause the burn-in process has been received. If not, the process loops around to the input of step 73, such that the ballast waits for a command to unpause the burn-in process. When the ballast receives a command to unpause the burn-in process at step 73, the process moves on to step 74, where the burn-in process resumes and the timer variable continues to increment to represent the passage of time.

Thereafter, the process branches to step 66, and a comparison is made of the value of the timer variable and the value of BURN-IN_MAX. If the burn-in process is not complete (i.e., the value of timer variable is less than BURN-IN_MAX), then the process loops back to step 54. Alternatively, if the value of the timer variable exceeds the value of BURN-IN-_MAX, then the burn-in process is deemed complete, and the process ends at step 68.

Thus, improvements associated with lamp burn-in functionality in accordance with the present invention are provided. Further, the burn-in functionality is provided in the ballast and is a part of the ballast out-of-box configuration.

Photosensor Data Averaging

As previously mentioned, ballasts 12 of the present invention are able to be connected to an external photosensor and receive readings from the photosensor. Ballasts 12 also are capable of transmitting and receiving sensor readings to and from one or more devices on communication link 16. A single ballast 12 may receive photosensor readings from a local attached photosensor and from a plurality of remote photosensors attached to other ballasts. In such a case, the processor 14 of ballast 12 is operable to receive the plurality of photosensor readings from the local photosensor and from the multiple remote photosensors and average the readings, as will be described in more detail below with reference to FIGS. 5 & 6. Averaging photosensor readings provides more accurate information with respect to identifying the amount of light that is produced by a lamp 44, and light that is produced, for example, from other sources, such as natural sunlight. As light conditions change during the course of a day, processor 14 continues to perform averaging in order to provide accurate sensor data for various devices on link 16.

In accordance with a preferred embodiment of the present invention, after averaging the readings from the multiple photosensors, the ballast 12 is operable to run a daylighting control algorithm that is used to control the intensity of the lamp 44 coupled to the ballast. Generally, photosensor readings include a component that is due to the local electric lights in the space and a component that is due to the daylight entering the space. Because the daylighting algorithm implemented by the ballast 12 is open loop, it is preferable that photosensor readings only reflect the amount of daylight entering the space. Thus, the component of the photosensor reading due to the contribution of the electric lights should be eliminated before the photosensor reading is used by the algorithm to control the lamp 14 connected to the ballast. The light contribution from the local electric lights is normally obtained when there is no contribution from daylight into the room, that is, all window treatments are closed or it is nighttime outside.

In accordance with the present invention, photosensor readings originating from a plurality of remote and/or a local photosensor 22 are averaged. As noted above, after a ballast 12 is commissioned, the ballast can be configured to receive data from one or more respective devices. Accordingly, photosensor averaging is preferably performed for those devices from which ballast 12 is configured to receive data.

Figure 5:
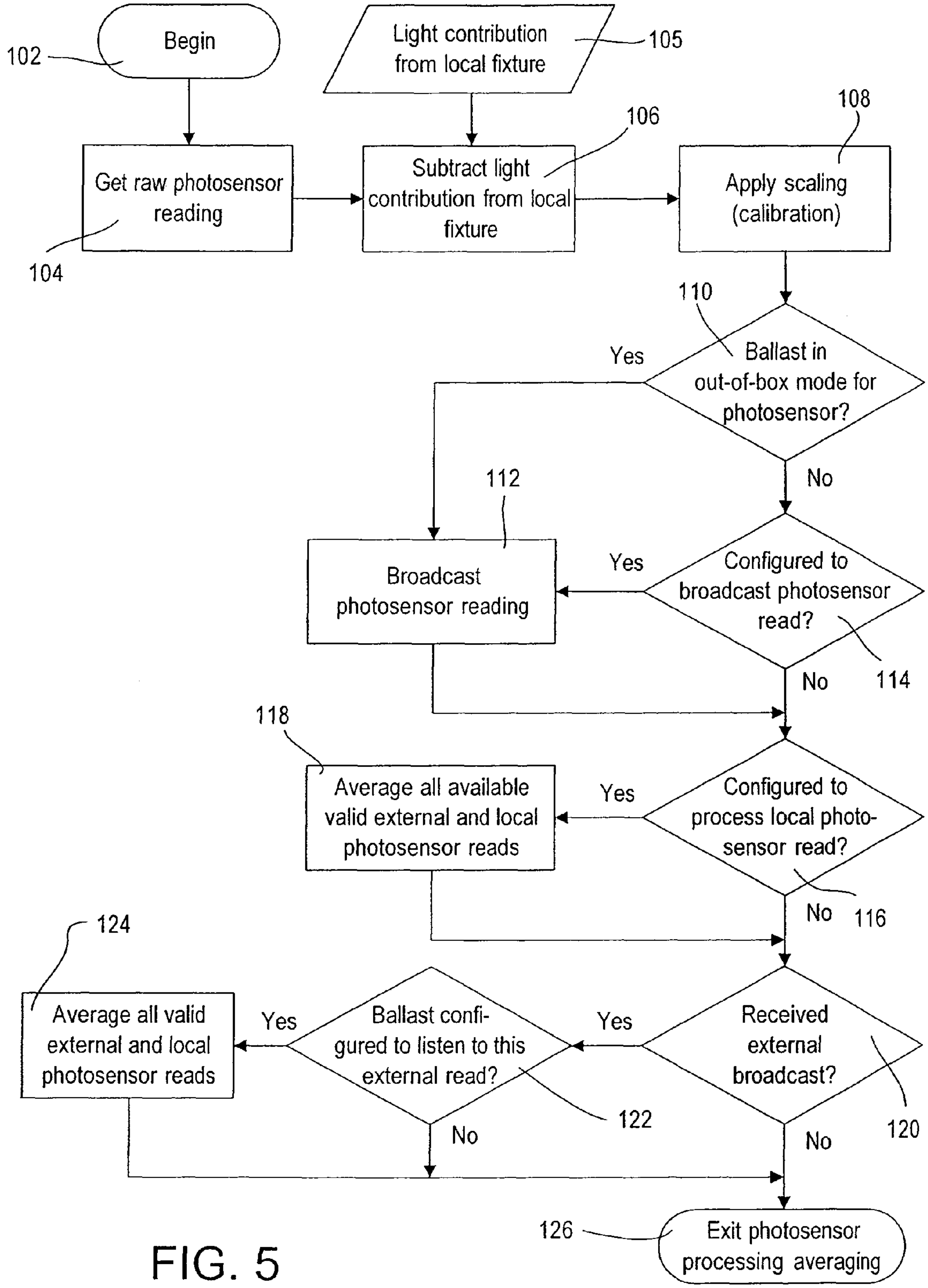
FIG. 5 shows the basic process flow for each ballast coupled into the lighting system of the present invention.
Figure 6:
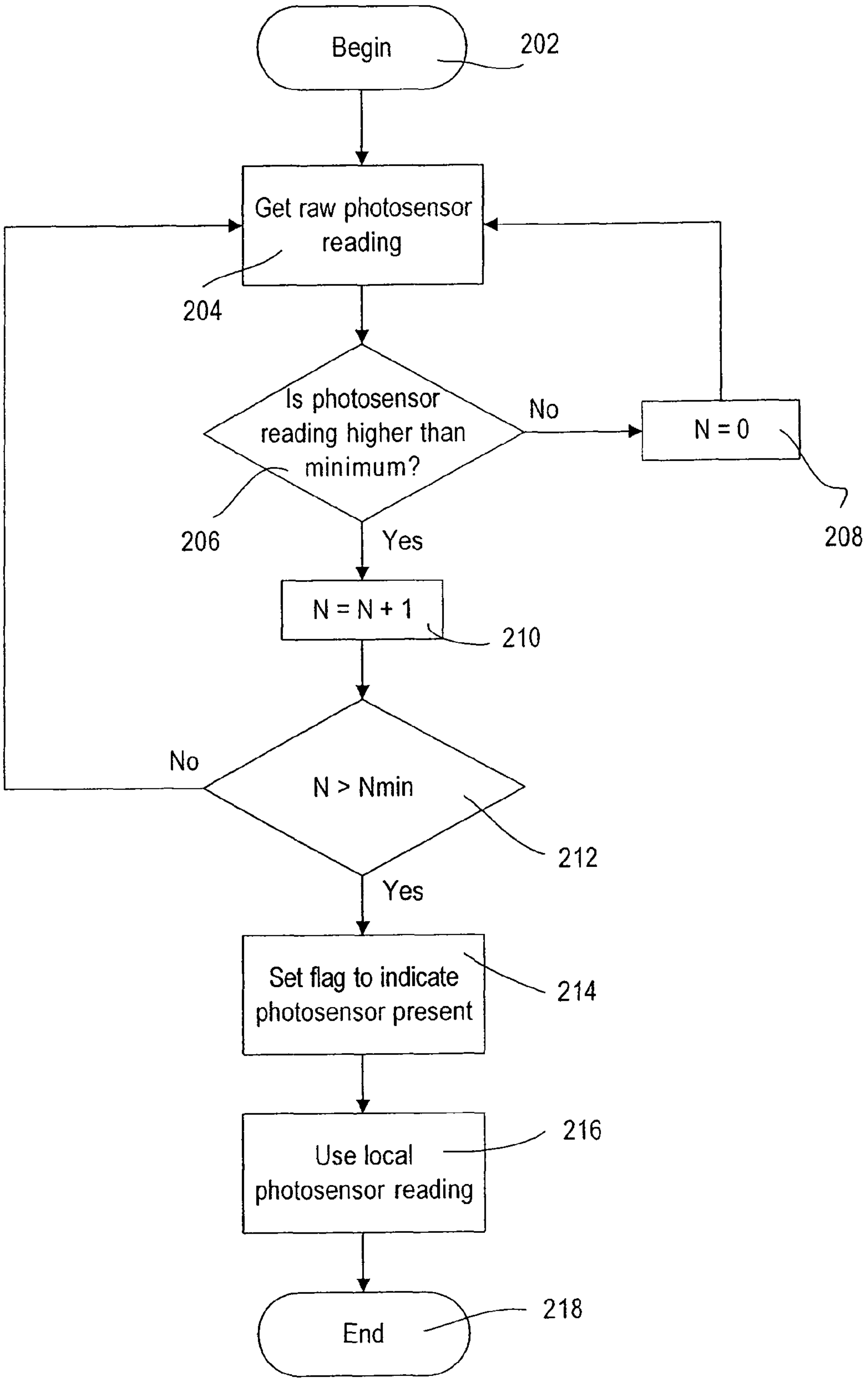
FIG. 6 shows the process of obtaining photosensor readings in accordance with the present invention.

With reference now to FIG. 5, the basic process flow for each ballast 12 coupled into the lighting system 100 of the present invention is shown. At step 104, a ballast obtains a raw photosensor reading. The process of obtaining photosensor readings is shown in FIG. 6 beginning at step 202. In particular, the raw photosensor reading is obtained by the ballast at step 204. At step 206, a determination is made as to whether the photosensor reading is higher than some preprogrammed minimum value. If it is less than the minimum value, this means either that no photosensor is attached or that the value is not an acceptable value and can not be used. If the value is not higher than the minimum, an exit is made and a counter N is reset at 208 and a new photosensor reading is obtained at 204. When the photosensor reading is higher than the minimum at 206, then the counter N is incremented at 210 and a determination is made at 212 whether the counter N has reached a minimum count Nmin. If not, a new photosensor reading is obtained and the photosensor reading is checked at 206 and the counter N is again incremented at 210. In this way, a photosensor reading is only accepted if it is higher than the minimum value for the required number of times, that is, the number of counts Nmin. Once Nmin counts of acceptable photosensor readings have been obtained at step 212, a flag is set at step 214 indicating that the photosensor is present and at step 216 the local photosensor reading can be used. The process exits at step 218, returning to the flowchart of FIG. 5.

Returning to FIG. 5, at step 106, the light contribution from the local electric lights is subtracted from the raw photosensor reading determined in the process of FIG. 6. This is to ensure that the photosensor reading only reflects the amount of daylight entering the space. At step 108, the photosensor reading from which the local light contribution has been subtracted is scaled to take into account photosensor tolerances. During commissioning, all photosensors are calibrated to determine the photosensor tolerances so that the photosensor readings from multiple photosensors at a given light level correspond to the same light level. The scaling factor is obtained from this calibration.

At step 110, the ballast is checked to determine if it is in out-of-box mode. According to the invention, as previously described, the ballast has an out-of-box mode so that it operates under a default set of rules when installed without any configuration. The ballast in such mode will operate in the system according to the invention even though it does not have a system address. Ballasts in out-of-box mode broadcast and receive all photosensor readings. If a ballast is in the out-of-box mode at step 110, the ballast therefore broadcasts the photosensor reading of the photosensor attached to that ballast on the DALI link 16. Since a ballast in out-of-box mode does not have an address, it sends a mask address along with the photosensor reading.

If the ballast is not in out-of-box mode at step 110, then it has been previously commissioned and assigned an address in the system. In step 114, ballast 12 checks to see if it is configured to broadcast the photosensor reading. If it is, the ballast 12 broadcasts the photosensor reading on the DALI link 16 in step 112. If not, the process reaches step 116 in which the ballast determines whether it is configured to process local photosensor readings. Not all ballasts are configured to process local photosensor readings. If it is configured to do so, then the ballast 12 will average all the available valid remote and local photosensor readings at step 118, that is, the ballast will take an average of the local photosensor reading as well as any other available remote photosensor readings that are stored in memory. As stated previously, if the ballast is in out-of-box mode it will receive all remote photosensor readings. If the ballast is not in out-of-box mode, i.e., it has been commissioned, the ballast will average all remote photosensor readings that it is configured to receive with the local photosensor reading that it is configured to process locally.

Once it has averaged all the photosensor reads or once the ballast has determined that the ballast is not configured to process local photosensor reads, the process will enter step 120 to determine if the ballast has received an external broadcast. External broadcasts comprise external sensor readings received over the communications link 16. If the ballast has received an external broadcast including a photosensor reading, the ballast checks at step 122 to determine if it is configured to listen to the external photosensor reading transmitted in the broadcast. If so, the ballast averages all the valid external and local photosensor readings at step 124. If not, the process moves to step 126. If the ballast has not received an external broadcast, the process moves to step 126.

The process flow in FIGS. 5 and 6 operates continuously. In the illustrated embodiment, the flow of FIGS. 5 and 6 is cycled through every 2.5 milliseconds.

As previously stated, the ballast 12 is operable to run a daylighting control algorithm that is used to control the intensity of the lamp 44 coupled to the ballast. An example of a basic daylighting control algorithm run by each ballast 12 can be expressed as follows:

$$INT=TLL-(PG*APR); \quad \text{(Equation 1)}$$

where:

INT=Output Intensity that the ballast 12 will set the lamp 44 to;

TLL=Photosensor Target Light Level Parameter, which represents the intensity required in the absence of daylight to achieve target light level;

PG=Photosensor Gain, which represents a ratio of daylight contribution at the fixture location with respect to sensor location; and APR=Average Photosensor Reading, which in determined by the process of FIGS. 5 & 6.

Further, if the computed output intensity INT is less than the photosensor low end intensity, which defines how low lights can dim due to control by the daylighting algorithm, then the output intensity INT is set equal to the photosensor low end intensity. The solution to these conditions, i.e. output intensity INT, is the intensity that the ballast 12 will drive the lamp 44 to.

Scaling Ballast Target Levels

Preferably, ballasts 12 of the present invention scale relative target levels to accommodate actual output ranges for various ballasts. For example, a command is transmitted from a device over link 16 and received by two other ballasts. The receiving ballasts may have different ranges of operation and may be unable to support the command due to these limitations. As described in greater detail below and with respect to the flow charts shown in FIGS. 7-10, the range between the receiving ballast's 12 high end limit and low end limit is used to scale the receiving command to be within the receiving ballast's available range of operation. As the amount of daylight changes during the day, the scale between a high end trim and low end trim may also change. Accordingly, the range may dynamically change during the course of the day.

In accordance with the prior art DALI protocol, an absolute (logarithmic) value is transmitted to receiving ballasts, for example, trim to 85%. However, 85% of the sending ballast's range of operation may be impossible for the receiving ballast. Thus, in accordance with the present invention, the 85% absolute value is scaled to be within the receiving ballast's range. The present invention accounts for ballasts 12 that have limited ranges to operate effectively over a communication link 16 with ballasts 12 that are not so limited.

Figure 7:
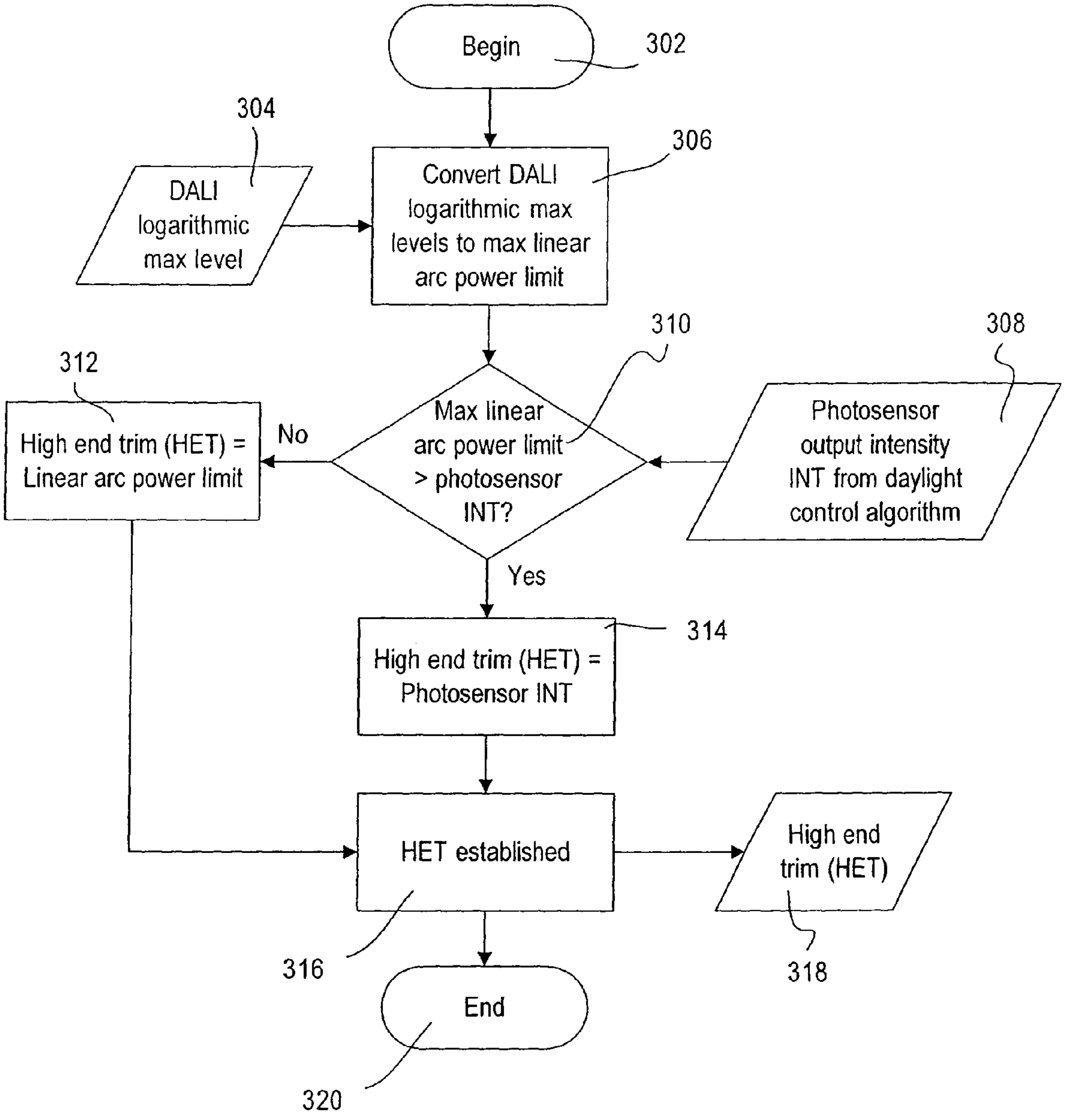
FIG. 7 shows steps associated with establishing a ballast high end trim
Figure 8:
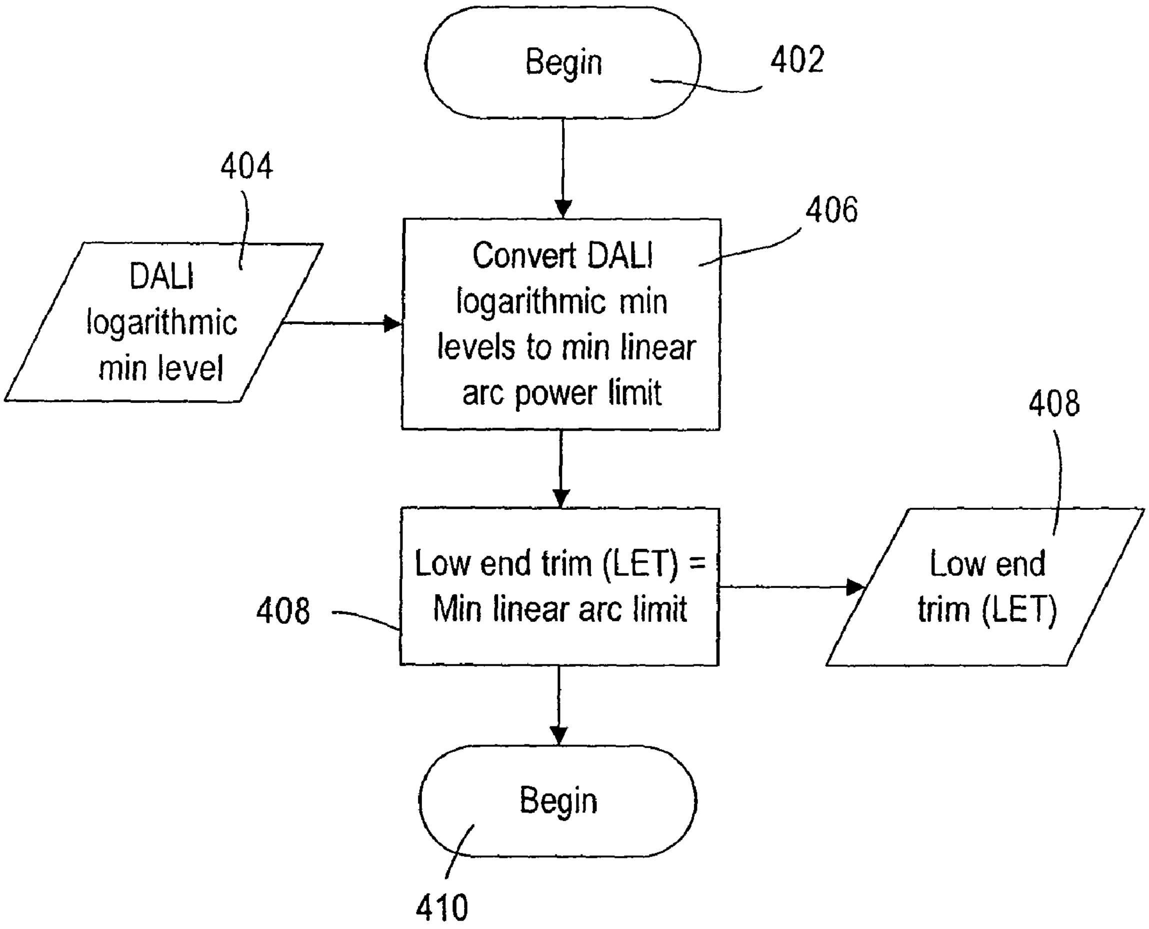
FIG. 8 shows steps associated with establishing a ballast low end trim
Figure 9:
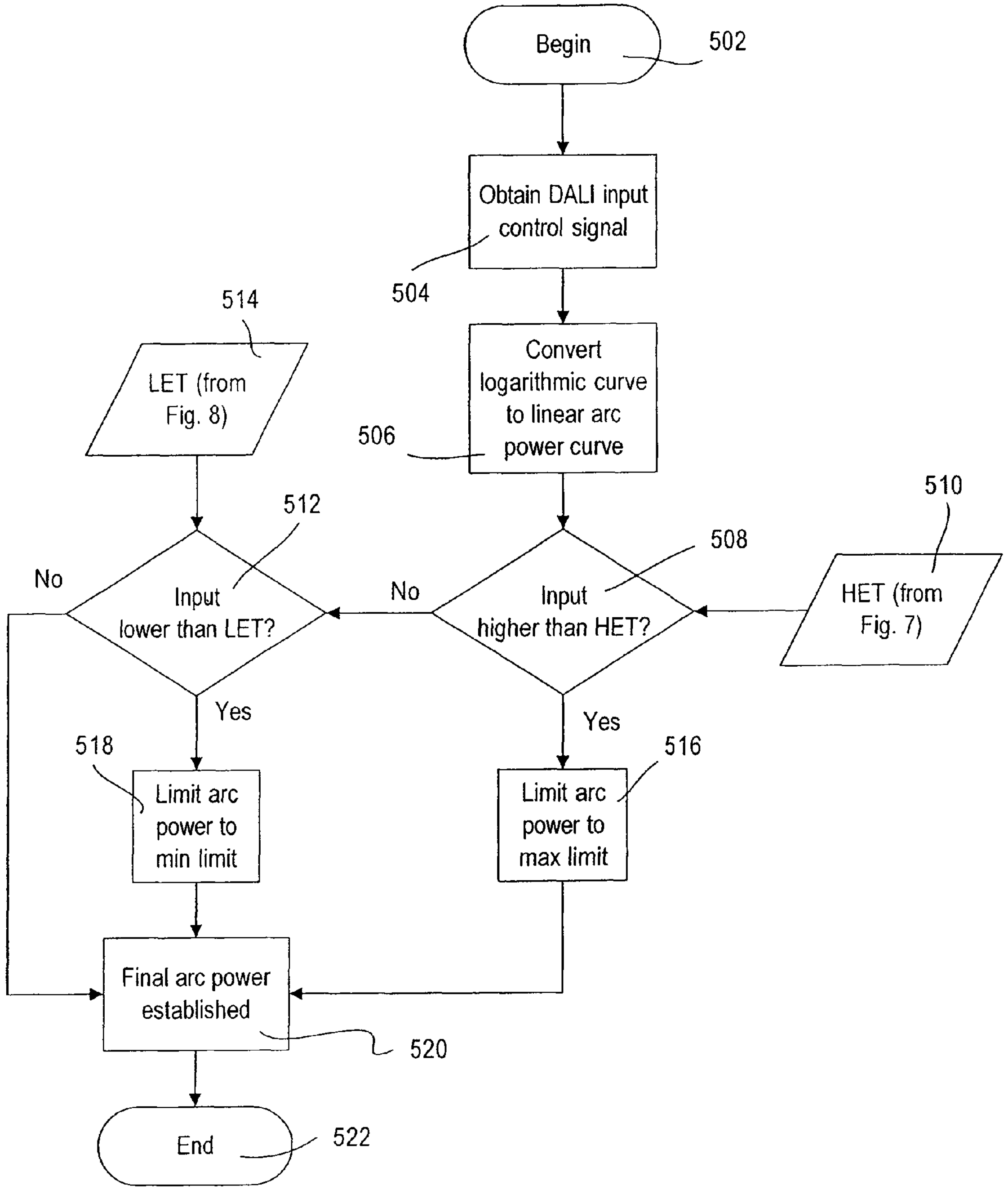
FIG. 9 shows how the ballast processor processes a normal DALI command.
Figure 10:
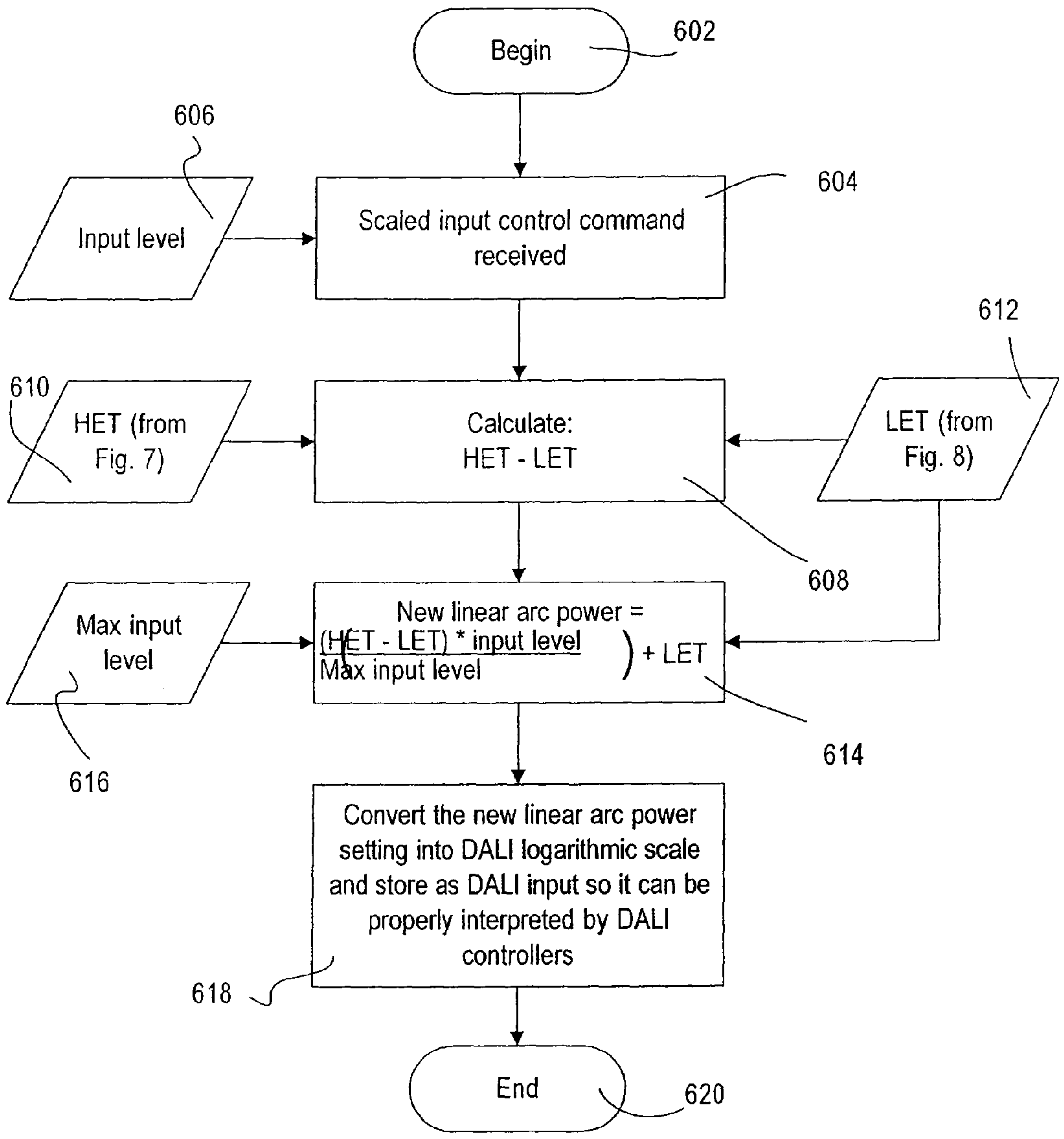
FIG. 10 shows how the ballast processor processes a scaled input control command in the extended protocol of the present invention.

FIGS. 7-10 show the flow establishing a ballast set point. FIG. 7 shows how the ballast high end trim (HET) is established. FIG. 8 shows how the ballast low end trim (LET) is established. FIG. 9 shows how a normal DALI command is processed by the ballast processor and FIG. 10 shows how a scaled input control command in the extended protocol, described previously, is processed.

Turning to FIG. 7, a flowchart showing how the HET is determined begins at step 302. A DALI logarithmic maximum level (at 304), which is stored in memory in the ballast, is converted at step 306 from the logarithmic level to a format that can be processed by the ballast. In particular, the standard DALI format is based on a logarithmic scale. In the preferred embodiment, the standard DALI logarithmic format is converted to a linear arc power level. At step 306 the DALI logarithmic maximum level is converted to a maximum linear arc power limit. At step 310, a comparison is made of the maximum linear arc power limit and the photosensor output intensity INT (at 308) from daylighting control algorithm. If the maximum arc power limit that is established in step 306 is greater than the photosensor output intensity INT, the ballast HET is determined to be the photosensor output intensity INT. If the maximum linear arc power limit is less than the photosensor output intensity INT, the HET is set at the linear arc power limit at step 312. The HET is thus established at step 316 either by the determination at step 312 or the determination at step 314. The HET is provided for other processes at 318 and the process exits at 320.

Turning to FIG. 8, a flowchart that shows how the low end trim is established begins at step 402. At 404, the preprogrammed DALI logarithmic minimum level is obtained and converted at step 406 to a minimum linear arc power limit. The ballast LET is established as the minimum arc limit and is provided for other processes at 408. The process exits at step 410.

The low and high end trims that is, the minimum and maximum ballast levels have now been established as LET and HET, respectively. In FIG. 9, the processing flow for a standard DALI command is shown. The DALI input is received at 504 and at 506 is converted to the linear arc power curve. At step 508, a comparison is made between the DALI input and HET obtained from FIG. 7. If the input is higher than HET, then at step 516 the arc power is limited to the maximum limit that is, HET. If the input is less than HET, a determination is made at step 512 if the input is lower than LET obtained from FIG. 8. If it is lower than LET, the arc power is set at the minimum limit that is, LET. If the input is greater than LET, the final arc power is established based upon the DALI input from step 504. Thus, the final arc power is established at step 520 and the process exits at step 522. Accordingly, the lamp arc power has been established and scaled to the ballast high and low end trim levels.

FIG. 10 shows the processing of an extended command based upon the extended protocol previously described. At step 604, a scaled input control command is received from 606. This command is not in DALI format but is part of the extended protocol previously described. At step 608 the difference between HET from 610 and LET from 612 is established. HET is determined at step 316 of FIG. 7, and LET is established at step 408 in FIG. 8. At step 614, the arc power level based upon the scaled input control command is determined as the product of the difference of HET and LET multiplied by a ratio of the input level received at step 604 divided by the maximum input level from 616. This product scales the input level to the ballast operating range as determined by HET and LET. This product is then added to LET so that the linear arc power level is never less than LET. So that other DALI controllers can process the linear arc power level established at step 614, the linear arc power level is converted into the DALI logarithmic scale and stored as a DALI input so it can be properly interpreted by DALI controllers as shown at step 618.

The high end trim and low end trim established in FIGS. 7 and 8 respectively are calculated and stored when the ballast is commissioned into the system. These stored values are later used when processing the DALI input command and the scaled input command from the extended protocol.

Figure 11:
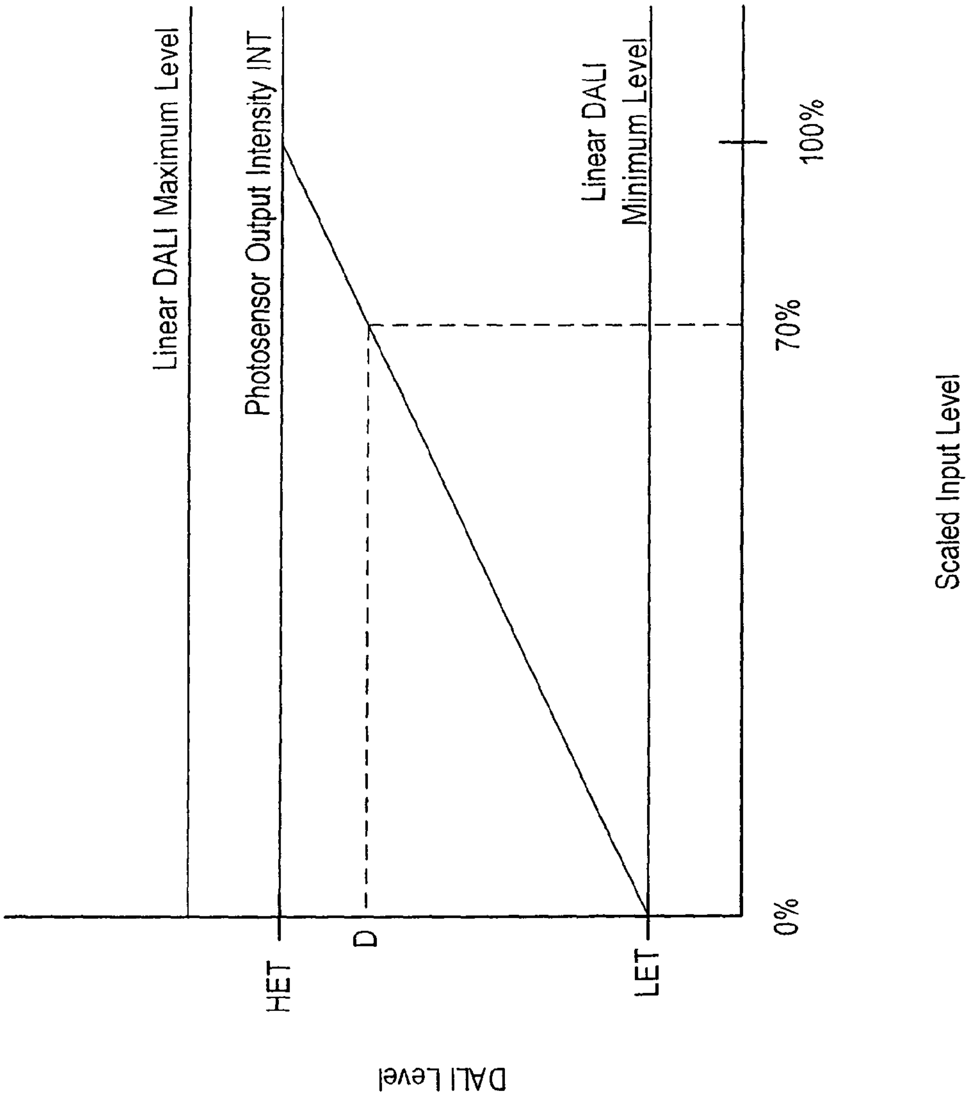
FIG. 11 shows a diagram summarizing the results of the flowcharts of FIGS. 7-10.

FIG. 11 shows a diagram summarizing the results of the flowcharts of FIGS. 7-10. The scaled input level is shown on the x-axis while the DALI input level is shown on the y-axis. In this example, HET is the photosensor output intensity INT and LET is the linear DALI minimum level. The linear DALI maximum level is greater than the photosensor output intensity INT. The sloped line between LET and HET represents the operating points of the ballast based on the scaled input level between 0% and 100%. For example, if the ballast receives a scaled input level of 70%, the ballast will operate at the DALI level marked D on FIG. 11.

Thus, improvements with respect to prior art lighting communication protocols, including the standard DALI, are improved by the features of the present invention. The extended DALI protocol is fully compatible with a conventional DALI network lighting system, and extends the capability of the system to permit greater functionality and flexibility. No new wiring or changes to the DALI bus or controller are needed to implement the protocol or to add new functionality to existing systems. In addition, the reserved DALI commands are not needed to extend the functionality and flexibility of the lighting network system, so that conflicts between devices made by different manufacturers are not an issue.

Preferably, power and control are distributed among intelligent devices, so that the failure of a given controller does not cause the entire network to fail. Each device on the network that is enabled with the extended protocol can act as a controller, with power supplied to each device individually. Such a system permits greater flexibility and faster responsiveness due to the lack of a centralized control that polls all the devices in the network on a cyclical basis.

Moreover, maintenance of a lighting system using the extended protocol system is more efficient and more easily achieved due to the localized rather than centralized control. The present invention is advantageous in that an additional controller can be attached to the extended DALI protocol network to act as a peer to peer controller to provide a gate keeping function between various devices on the network. In such a configuration, peer to peer operations increase bandwidth and responsiveness in the DALI lighting system to provide greater functionality and flexibility for the entire system.

Ballasts of the present invention are preferably configured in a default "out-of-box" mode to perform various functions upon installation and without additional configuration and setup, such as to utilize sensor inputs and communication link broadcasting. Further, ballasts are configured to function as a normal (prior art) DALI ballast such that information that is broadcast over a DALI compatible communication link is automatically received by a ballast that has not yet been commissioned.

Also, commissioning devices over the distributed system of the present invention, such as assigning addresses to devices and programming devices for various tasks is greatly simplified. This is accomplished, in part, by utilizing the extended DALI protocol that enables receiving commands in various ways, such as by entering commands on a keypad, using an infra-red transmitter or by transmitting commands from other devices.

Further, the present invention improves steps associated with commissioning (and re-commissioning) ballasts. In part, this is accomplished via a database that stores configuration information for every ballast on a communication link and referenced to re-commission a replacement ballast.

Moreover, the present invention provides programming routines that can be used, for example, by a single ballast configured to receive sensor readings from a plurality of photocells, and, thereafter to average the sensor readings and broadcast the averaged readings to other devices on the link. Moreover, the present invention supports scaling algorithms to accommodate various operation range limitations of various ballasts.

The present invention also provides improves seasoning or "burn-in" processes associated with of lamps. Commands, such as to dim a lamp, are ignored until a burn-in process completes, and the invention pauses lamp burn-in processes during ballast commissioning.

Although the present invention has been described in relation to particular embodiments thereof, many other variations and modifications and other uses will become apparent to those skilled in the art. Therefore, the present invention should be limited not by the specific disclosure herein.

What is claimed is:

1. A method for commissioning a ballast in a distributed addressable lighting system having a plurality of ballasts connected by a digital electronic communication link, the method comprising:

installing the ballast so that it is in communication with the digital electronic communication link;

the ballast having a programmable processor;

operating the ballast with an out-of-box default mode wherein the ballast is configured to receive electronic information and broadcast the received electronic information over the digital electronic communication link without requiring any programming configuration of the ballast when the ballast is installed in the system; and electronically transmitting commands to the ballast over the digital electronic communication link to assign an address to the ballast and to configure the ballast with desired performance characteristics.

2. The method of claim 1, wherein the performance characteristics include configuring the ballast to transmit information to a selected group of remote devices.

3. A method for commissioning a ballast in a distributed addressable lighting system having a plurality of ballasts connected by a digital electronic communication link, the method comprising:

providing the ballast with an out-of-box default mode wherein the ballast is configured to receive and transmit electronic information over the digital electronic communication link;

installing the ballast so that it is in communication with the digital electronic communication link; and electronically transmitting commands to the ballast over the digital electronic communication link to assign an address to the ballast and to configure the ballast with desired performance characteristics;

wherein the performance characteristics include restricting the ballast to receiving transmissions from at least one particular remote device.

4. A method for commissioning a ballast in a distributed addressable lighting system having a plurality of ballasts connected by a digital electronic communication link, the method comprising:

providing the ballast with an out-of-box default mode wherein the ballast is configured to receive and transmit electronic information over the digital electronic communication link;

installing the ballast so that it is in communication with the digital electronic communication link; and electronically transmitting commands to the ballast over the digital electronic communication link to assign an address to the ballast and to configure the ballast with desired performance characteristics;

wherein the performance characteristics include restricting the ballast to transmission of information to at least one particular remote device.

5. A ballast in a distributed addressable lighting system having a plurality of ballasts connected by a digital electronic communication link, wherein the ballast is adapted to be commissioned for operation on the communication link, the ballast comprising:

a memory storing a ballast configuration representing an out-of-box default mode wherein the out-of-box default mode allows the ballast to receive electronic information and broadcast the electronic information over the digital electronic communication link without requiring any programming configuration of the ballast;

a programmable processor;

a communication port enabling the processor to communicate over the digital electronic communication link; and wherein the processor receives commands transmitted over the digital electronic communication link to assign an address to the ballast and to configure the ballast with desired performance characteristics.

6. The ballast of claim 5, wherein the performance characteristics include configuring the ballast to transmit information to a selected group of remote devices.

7. A ballast in a distributed addressable lighting system having a plurality of ballasts connected by a digital electronic communication link, wherein the ballast is adapted to be commissioned for operation on the communication link, the ballast comprising:

a memory storing a ballast configuration representing an out-of-box default mode wherein the out-of-box default mode allows the ballast to receive and transmit electronic information over the digital electronic communication link;

a processor;

a communication port enabling the processor to communicate over the digital electronic communication link; and wherein the processor receives commands transmitted over the digital electronic communication link to assign an address to the ballast and to configure the ballast with desired performance characteristics, the performance characteristics including restricting the ballast to receiving transmissions from at least one particular remote device.

8. A ballast in a distributed addressable lighting system having a plurality of ballasts connected by a digital electronic communication link, wherein the ballast is adapted to be commissioned for operation on the communication link, the ballast comprising:

a memory storing a ballast configuration representing an out-of-box default mode wherein the out-of-box default mode allows the ballast to receive and transmit electronic information over the digital electronic communication link;

a processor;

a communication port enabling the processor to communicate over the digital electronic communication link; and wherein the processor receives commands transmitted over the digital electronic communication link to assign an address to the ballast and to configure the ballast with desired performance characteristics, the performance characteristics including restricting the ballast to transmission of information to at least one particular remote device.

9. A ballast for use in a multi-ballast lighting system wherein the ballasts are coupled together by a digital communication network, the ballast comprising:

a power circuit portion having an input to an AC main supply and for providing an electrical current to power a lamp;

a digital processing circuit portion having a sensor input circuit for receiving at least one sensor input from a sensor device in the space illuminated by the system; further comprising a processor receiving an input from the sensor input circuit and providing control signals to control the operation of the ballast; and further comprising a communication port coupled to the processor and to the communication network for exchanging data with the communication network;

further wherein the ballast has an out-of-box mode in which the ballast has a default configuration allowing the ballast to communicate with the network and receive at least one input from the sensor input circuit without requiring any programming configuration of the ballast when the ballast is installed in the system.

10. The ballast of claim 9, wherein, in the out-of-box mode, the ballast will transmit onto the network via the communication port the sensor input received from the sensor input circuit.

11. The ballast of claim 9, wherein the ballast can be reconfigured from the out-of-box mode to a customized mode having customized characteristics after installation into the system.

* * * * *